(12) United States Patent
Bassett et al.

(10) Patent No.: US 12,545,755 B2
(45) Date of Patent: Feb. 10, 2026

(54) NETWORK TOUGHENING OF ADDITIVELY MANUFACTURED, HIGH GLASS TRANSITION TEMPERATURE MATERIALS VIA SEQUENTIALLY CURED, INTERPENETRATING POLYMERS

(71) Applicants: Rowan University, Glassboro, NJ (US); The United States of America as Represented by the Secretary of the Army, Washington, DC (US)

(72) Inventors: Alexander W. Bassett, Mullica Hill, NJ (US); Joseph F. Stanzione, III, Wilmington, DE (US); John J. La Scala, Wilmington, DE (US)

(73) Assignees: Rowan University, Glassboro, NJ (US); The United States of America as represented by the Secretary of the Army, Washington, DC (US)

( * ) Notice: Subject to any disclaimer, the term of this patent is extended or adjusted under 35 U.S.C. 154(b) by 592 days.

(21) Appl. No.: 17/799,982

(22) PCT Filed: Feb. 18, 2021

(86) PCT No.: PCT/US2021/018547
§ 371 (c)(1),
(2) Date: Aug. 16, 2022

(87) PCT Pub. No.: WO2021/230940
PCT Pub. Date: Nov. 18, 2021

(65) Prior Publication Data
US 2023/0096016 A1    Mar. 30, 2023

Related U.S. Application Data

(60) Provisional application No. 63/014,932, filed on Apr. 24, 2020, provisional application No. 62/977,986, filed on Feb. 18, 2020.

(51) Int. Cl.
*C08F 220/18*    (2006.01)

(52) U.S. Cl.
CPC .............................. *C08F 220/1806* (2020.02)

(58) Field of Classification Search
None
See application file for complete search history.

(56) References Cited

U.S. PATENT DOCUMENTS 4,433,958 A    2/1984   Fellman et al.
5,360,877 A *  11/1994  Hwang ................. C08G 59/50
                                              528/109

(Continued)

FOREIGN PATENT DOCUMENTS

CN    101178539 A  *  5/2008  ........... B29C 64/135
EP    0245559 A2      11/1987

(Continued)

OTHER PUBLICATIONS

Baroncini et al. (2016), Recent advances in bio-based epoxy resins and bio-based epoxy curing agents. J. Appl. Polym. Sci., 133, 44103. (Year: 2016).*

(Continued)

*Primary Examiner* — Sanza L. McClendon
(74) *Attorney, Agent, or Firm* — Saul Ewing LLP; Domingos J. Silva; Dennis Ostrovsky

(57) ABSTRACT

Resins and formulations of individual monomers bearing both vinyl ester and epoxy functionality were either synthesized or formulated such that vinyl ester components capable of polymerizing by photo-induced, free radical polymerization were mixed with step-growth epoxy-amine systems, facilitating sequential cure. The vinyl ester component was photopolymerized using vat photopolymerization (VPP). Additionally, the preparation of bio-based photo curable thermosetting resins that have tailorable thermal and (Continued)

mechanical properties is provided. All monomers and polymers described herein are useful in a variety of applications, including additive manufacturing applications.

19 Claims, 15 Drawing Sheets

(56) References Cited

U.S. PATENT DOCUMENTS

| | | | | |
|---|---|---|---|---|
| 6,042,943 | A * | 3/2000 | Levy | C03C 25/106 |
| | | | | 522/170 |
| 6,054,250 | A * | 4/2000 | Sitzmann | C08F 283/10 |
| | | | | 522/170 |
| 6,767,935 | B1 * | 7/2004 | Luchterhandt | A61K 6/61 |
| | | | | 522/170 |
| 6,833,231 | B2 * | 12/2004 | Moussa | G03F 7/0037 |
| | | | | 430/920 |
| 7,799,194 | B2 | 9/2010 | Makuska | |
| 8,372,908 | B2 | 2/2013 | Guo et al. | |
| 8,383,025 | B2 * | 2/2013 | Li | C08B 37/0021 |
| | | | | 264/496 |
| 10,227,445 | B2 * | 3/2019 | Koebler | C08G 18/8175 |
| 10,350,823 | B2 * | 7/2019 | Rolland | B29C 64/129 |
| 10,975,193 | B2 * | 4/2021 | Cushen | C08J 5/00 |
| 11,208,420 | B2 * | 12/2021 | Sadler | C07C 67/08 |
| 11,535,686 | B2 * | 12/2022 | Menyo | B33Y 10/00 |
| 11,667,669 | B2 * | 6/2023 | Bassett | C07D 493/04 |
| | | | | 549/465 |
| 11,814,472 | B2 * | 11/2023 | Cushen | B29C 64/35 |
| 12,062,923 | B2 * | 8/2024 | Garripoli | H04B 5/79 |
| 2005/0228064 | A1 * | 10/2005 | Johnson | G03F 7/0037 |
| | | | | 522/168 |
| 2014/0249285 | A1 | 9/2014 | Palmese et al. | |
| 2016/0209591 | A1 | 7/2016 | Sakai et al. | |
| 2017/0210689 | A1 | 7/2017 | Reno et al. | |
| 2018/0142052 | A1 | 5/2018 | Palmese et al. | |
| 2020/0048301 | A1 * | 2/2020 | Bassett | C08F 222/102 |
| 2020/0070407 | A1 * | 3/2020 | Menyo | B33Y 10/00 |

FOREIGN PATENT DOCUMENTS

| | | |
|---|---|---|
| JP | 2015034240 A | 2/2015 |
| JP | 2017069451 A | 4/2017 |
| JP | 2019099772 A | 6/2019 |
| JP | 2019131629 A | 8/2019 |
| JP | 2020166031 A | 10/2020 |
| WO | 2017044381 A1 | 3/2017 |
| WO | 2019160991 A1 | 8/2019 |

OTHER PUBLICATIONS

Bassett et al. Nature-Inspired Resins for Additive Manufacturing. ACS Symposium Series (2020), 1372, 69-88 (Year: 2020).*
Supplementary Partial EP Search Report dated Mar. 11, 2024 for co-pending European Application No. 21 80 3414.
Auvergne, et al., "Biobased Thermosetting Epoxy: Present and Future", Chem Rev, 114(2), 2014, pp. 1082-1115.
Bassett, "Synthesis and characterization of molecularly hybrid bisphenols derived from lignin and CNSL: Application in thermosetting resins", European Polymer Journal, 111, 2019, pp. 95-103.
Hernandez, E.D., "Synthesis and Characterization of Vanillyl Alcohol Based Thermosetting Epoxy Resins", Rowan University, Theses and Dissertations, 458, retrieved from the internet: URL: https://rdw.rowan.edu/cgi/viewcontent.cgi?article=1457*amp;context=etd, retrieved Oct. 15, 2021, Aug. 18, 2015.
Jin, et al., "Synthesis and application of epoxy resins: A review", J Ind Eng Chem, 29, 2015, pp. 1-11.
La Scala, et al., "Fatty acid-based monomers as styrene replacements for liquid molding resins", Polymer, 45(22), 2004, pp. 7729-7739.
La Scala, et al., "The use of bimodal blends of vinyl ester monomers to improve resin processing and toughen polymer properties", Polymer, vol. 46, 2005, pp. 2908-2921.
Ligon, et al., "Polymers for 3D Printing and Customized Additive Manufacturing", Chem Rev, 117(15), 2017, pp. 10212-10290.
Sadler, et al., "Isosorbide-methacrylate as a bio-based low viscosity resin for high performance thermosetting applications", J Mater Chem A, 1(40), 2013, pp. 12579-12586.
Stanzione III, "Vanillin-based resin for use in composite applications", Green Chem, 14(8), 2012, pp. 2346-2352.
Yadav, et al., "Recent advances in plant-based vinyl ester resins and reactive diluents", Eur Polym J, 98, 2018, pp. 199-215.
International Search Report and Written Opinion dated Nov. 23, 2021 for corresponding PCT International Application No. PCT/US21/18547.
English translation of JP2015034240 to Sanyo Chem Ind.
English translation of JP2017069451 to Taiyo Ink Mfg.
English translation of JP2019099772 to Ricoh Co Ltd.
English translation of JP2019131629 to Mitsubishi Electric Corp.
English translation of JP2020166031 to Hitachi Chem Co Ltd.

* cited by examiner

Phenyl Methacrylate (PM)

Epikure™ W

Partially Methacrylated Diglycidyl Ether of Bisphenol A (EM828)

Diglycidy Ether of Bisphenol A (Epon828)

Bismethacryl Glycidyl Ether of Bisphenol A Epoxy
(Vinyl Ester 828, VE828)

Step 1:

Phenol + Methacrylic Anhydride → Phenyl Methacrylate (PM) + Methacrylic Acid

Step 2:

Methacrylic Acid + Diglycidyl Ether of Bisphenol A (Epon828)

Partially Methacrylated Diglycidyl Ether of Bisphenol A (EM828)

NETWORK TOUGHENING OF ADDITIVELY MANUFACTURED, HIGH GLASS TRANSITION TEMPERATURE MATERIALS VIA SEQUENTIALLY CURED, INTERPENETRATING POLYMERS

CROSS-REFERENCE TO RELATED APPLICATIONS

This application is a 35 U.S.C. § 371 national phase application of, and claims priority to, International Application No. PCT/US2021/018547, filed Feb. 18, 2021, which claims priority under 35 U.S.C. § 119(e) to U.S. Provisional Patent Application Ser. No. 62/977,986 entitled "NETWORK TOUGHENING OF ADDITIVELY MANUFACTURED, HIGH GLASS TRANSITION TEMPERATURE MATERIALS VIA SEQUENTIALLY CURED, INTERPENETRATING POLYMERS," filed Feb. 18, 2020 and to U.S. Provisional Patent Application Ser. No. 63/014,932 entitled "BIO-BASED ADDITIVE MANUFACTURING RESINS AND METHODS OF MAKING AND USING THE SAME," filed Apr. 24, 2020, the disclosures of which are incorporated herein by reference in their entireties.

STATEMENT REGARDING FEDERALLY SPONSORED RESEARCH

This invention was made with Government support under grant numbers W911 NF 14-2-0086, W911NF 17-2-0227, W911NF-16-2-0225, and W911NF 19-2-0152 awarded by the U.S. Army Research Laboratory. The Government has certain rights in the invention.

BACKGROUND

Interpenetrating polymer networks (IPNs) are defined by as a combination of two or more individual polymer networks whereby at least one of the polymer networks if formed in the presence of the other. IPNs are utilized in a broad range of applications such as biomedical materials, sound and vibration damping materials, and ion exchange resins. There exist numerous types of IPNs, including sequential, simultaneous, latex, gradient, and thermoplastic IPNs, which are formed via different methods of polymerization and/or utilizing different initial blended components in the IPN formulation. Interestingly, IPNs have found utility in a variety of additive manufacturing (AM) applications.

The utilization of AM, a layer-wise process more commonly known as 3D printing, has gained significant traction in industry, military, and academia due to efficient material use, rapid production times, and the ability to create complex parts on-demand while removing manufacturing constraints that typically exist with conventional methods. Vat photopolymerization (VPP) is an AM method in which layers are formed via the photopolymerization of a liquid resin by via UV/visible light. Localized curing of the resin occurs due to the laser beam scanning or digital light processing of specific locations on the surface of the resin, after which the material is raised/lowered vertically by the desired layer thickness, which ranges from 25 to 200 microns, allowing the resin to backfill and a new layer to be cured and polymerized to the previously made layer. Parts printed via VPP are usually exposed to post-processing to reach higher degrees of cure. Layered fabrication as a result of VPP typically leads to mechanical an isotropy; yet, VPP printed parts are effectively isotropic due to inter-layer crosslinks formed during photopolymerization. VPP resins that are readily available usually contain both (meth)acrylate and/or epoxy functionality, both of which are polymerized via light. Both functionalities are usually present as (meth) acrylate-based resins typically lead to less accurate parts and overall distortion, leading to weakening of mechanical properties, but can be polymerized quickly due to high cure rates. Furthermore, epoxy resins, while having prohibitively slow cure rates, have less shrinkage and produce more accurate geometries leading to increase mechanical performance. As a result, most VPP resins are comprised of both (meth) acrylate and epoxy functionality to combine their independent advantages.

Thermosetting polymers including epoxy and vinyl ester resins are widely used in commercial and military applications due to their outstanding properties including high glass transition temperatures ($T_g$s), moduli, strengths, chemical resistances, and toughness. Epoxy resins are characterized by an oxirane moiety, which can be polymerized via multiple mechanisms including ionic polymerizations and, more commonly for higher performance materials, epoxy-amine step-growth polymerizations. Vinyl ester resins are generally produced via the esterification of epoxy resins to incorporate vinyl moieties that are capable of being polymerized via radical-based polymerization mechanisms. Both epoxy and vinyl ester resins are typically cured and molded via conventional, thermally driven procedures; however, the properties displayed by epoxy-amine and vinyl ester resins and their versatility of polymerization makes them intriguing candidates for AM, in general.

BRIEF SUMMARY OF THE DISCLOSURE

The present disclosure describes interpenetrating polymer networks (IPNs) comprised of vinyl ester and epoxy-amine components, exemplified in a non-limiting manner in FIG. 1, which were prepared via sequential cure using VPP methods. VPP was utilized to photopolymerize the vinyl ester components and encapsulate the epoxy and amine monomers within the methacrylate-based polymer matrix. The samples were subsequently post-processed to facilitate the sequential thermal cure of the epoxy-amine network to form the IPN.

In various embodiments, an interpenetrating polymer network (IPN) is provided. The IPN includes the reaction product of crosslinker comprising at least one epoxy curing group and a compound comprising at least one vinyl ester functionality and at least one epoxy functionality. The at least one vinyl ester functionality is polymerized by photo-induced, free radical polymerization, and the at least one epoxy functionality and the crosslinker are polymerized by thermal step-growth polymerization.

In various embodiments, a method of preparing an interpenetrating polymer network (IPN). In various embodiments, the method includes applying VPP to a mixture of a crosslinker comprising at least one epoxy curing group and a monomer, oligomer, or polymer bearing at least one vinyl ester functionality and at least one epoxy functionality under conditions whereby the vinyl ester functionality is photopolymerized; and exposing the resulting mixture to thermal conditions whereby epoxy-amine polymerization takes place.

In various embodiments, the compound can be a monomer or polymer. In various embodiments, the monomer or polymer can be a compound of Formula I, Formula I-A, Formula II, Formula III, Formula III-A, or Formula IV, and/or combinations thereof, having the following structures:

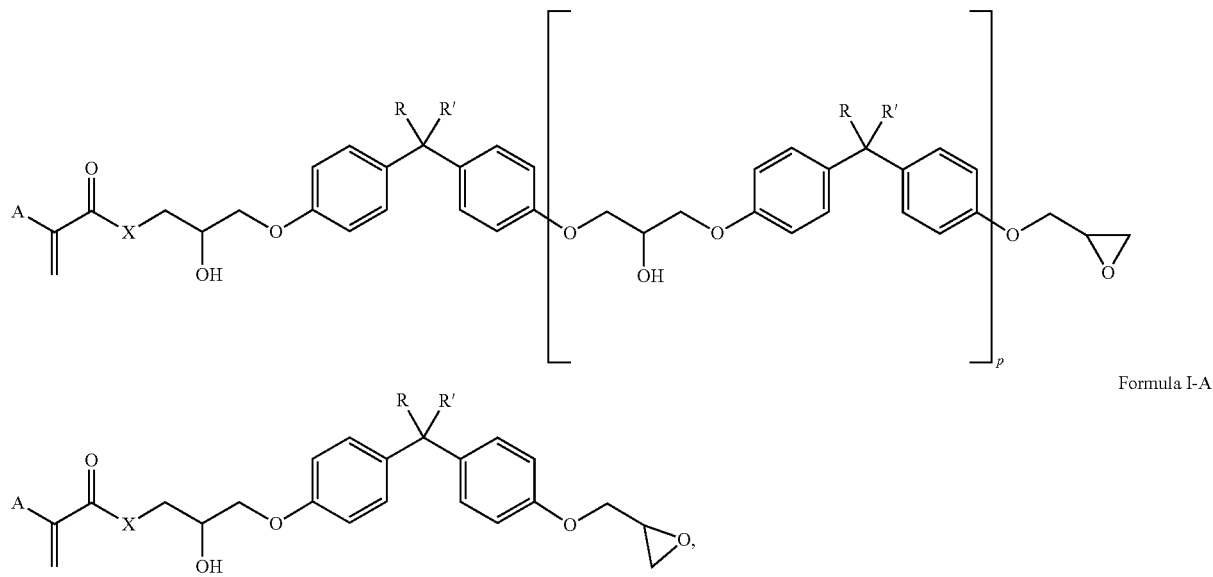

Formula I

Formula I-A wherein:
  A is selected from the group consisting of H, $C_{1-3}$ alkyl, CN, F, Cl, and perfluorinated $C_{1-3}$ alkyl;
  X is O or N—R";
  each occurrence of R is independently selected from the group consisting of H, $C_{1-3}$ alkyl, F, and perfluorinated $C_{1-3}$ alkyl;
  each occurrence of R' is independently selected from the group consisting of H, $C_{1-3}$ alkyl, F, and perfluorinated $C_{1-3}$ alkyl;
  R" is H or $C_{1-3}$ alkyl; and
  p is an integer from 0 to 100,000; or alkynyl, optionally $C_1$-$C_6$ alkoxy, optionally $C_1$-$C_6$ aminoalkyl, optionally $C_1$-$C_6$ haloalkoxy, and optionally $C_1$-$C_6$ haloalkyl;
n is 5, 6, 7, 8, 9, 10, 11, 12, 13, 14, 15, 16, 17, 18, 19, or 20; or

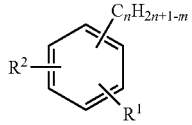

Formula II

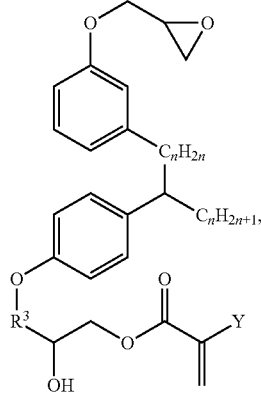

Formula III-A

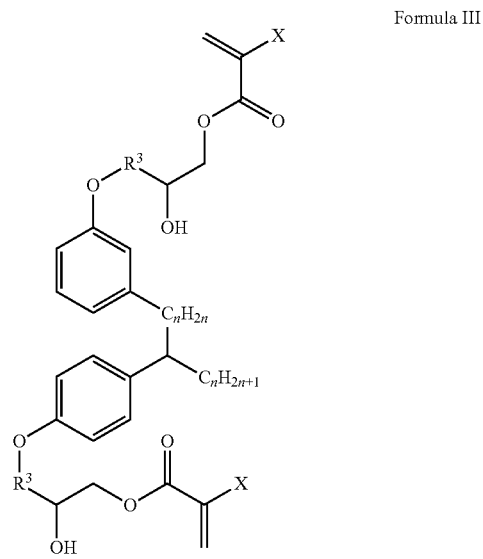

Formula III wherein:
  each instance of $R^3$ is independently selected from the group consisting of optionally substituted $C_1$-$C_6$ alkyl, optionally substituted $C_2$-$C_6$ alkenyl, optionally $C_2$-$C_6$ alkynyl;
  each instance of Y is independently selected from the group consisting of optionally substituted $C_1$-$C_6$ alkyl, optionally substituted $C_2$-$C_6$ alkenyl, optionally $C_2$-$C_6$

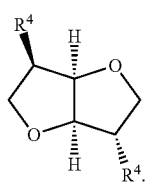

Formula IV herein:
R¹ is

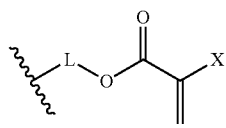

L is selected from the group consisting of a bond, $C_1$-$C_6$ alkyl, $C_2$-$C_6$ alkenyl, and $C_2$-$C_6$ alkynyl;

R² is selected from the group consisting of optionally substituted $C_1$-$C_6$ alkyl, optionally substituted $C_2$-$C_6$ alkenyl, and optionally $C_2$-$C_6$ alkynyl, wherein the substituents are selected from the group consisting of optionally substituted aryl and optionally substituted heteroaryl;

each instance of R³ is independently selected from the group consisting of optionally substituted $C_1$-$C_6$ alkyl, optionally substituted $C_2$-$C_6$ alkenyl, optionally $C_2$-$C_6$ alkynyl;

R⁴ is,

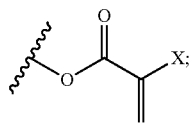

each instance of X is independently selected from the group consisting of optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, and optionally $C_1$-$C_6$ haloalkyl;

n is 5,6,7,8,9, 10, 11, 12, 13, 14, 15, 16, 17, 18, 19, or 20;
m is 0, 2, 4, 6, or 8.

BRIEF DESCRIPTION OF THE FIGURES

The drawings illustrate generally, by way of example, but not by way of limitation, various embodiments of the present application.

DETAILED DESCRIPTION OF THE DISCLOSURE

Figure 1:
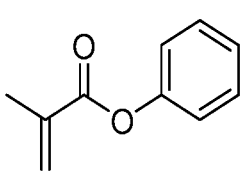
FIG. 1 shows chemical structures of polymers and monomers used to make interpenetrating polymer networks (IPNs), in accordance with various embodiments.
Figure 1:
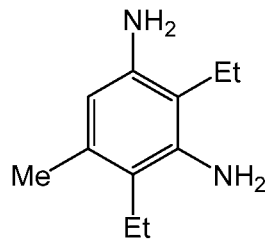
Figure 1:
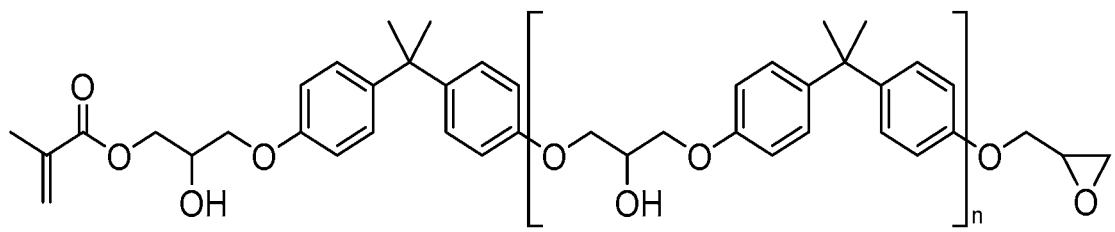
Figure 1:
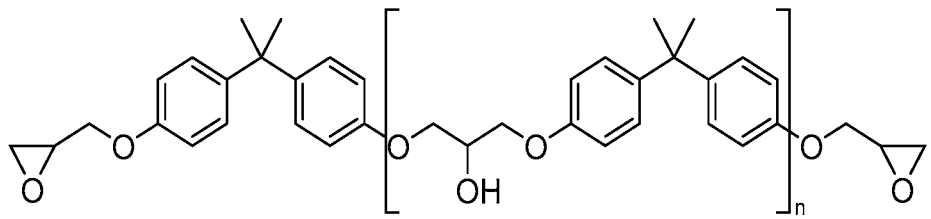
Figure 1:
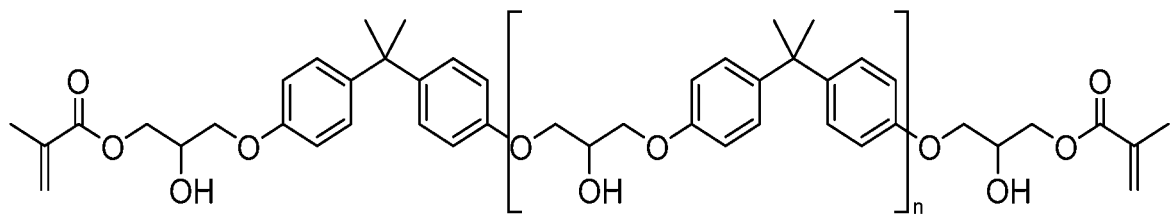

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference.

In the methods described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Definitions

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to, vinyl, —CH=C=CH$_2$, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, ≡C≡C(CH$_3$), ≡C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing three or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. The term heterocyclyl includes rings where a CH$_2$ group in the ring is replaced by one or more C=O groups, such as found in cyclic ketones, lactones, and lactams. Examples of heterocyclyl groups containing a C=O group include, but are not limited to, β-propiolactam, γ-butyrolactam, δ-valerolactam, and ε-caprolactam, as well as the corresponding lactones. A heterocyclyl group designated as a C$_2$-heterocyclyl can be a 5-ring with two carbon atoms and three heteroatoms, a 6-ring with two carbon atoms and four heteroatoms and so forth. Likewise a C$_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups. For example, a dioxolanyl ring and a benzdioxolanyl ring system (methylenedioxyphenyl ring system) are both heterocyclyl groups within the meaning herein. The phrase also includes polycyclic ring systems containing a heteroatom such as, but not limited to, quinuclidyl. Heterocyclyl groups can be unsubstituted, or can be substituted as discussed herein. Heterocyclyl groups include, but are not limited to, pyrrolidinyl, piperidinyl, piperazinyl, morpholinyl, pyrrolyl, pyrazolyl, triazolyl, tetrazolyl, oxazolyl, isoxazolyl, thiazolyl, pyridinyl, thiophenyl, benzothiophenyl, benzofuranyl, dihydrobenzofuranyl, indolyl, dihydroindolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Representative substituted heterocyclyl groups can be mono-substituted or substituted more than once, such as, but not limited to, piperidinyl or quinolinyl groups, which are 2-, 3-, 4-, 5-, or 6-substituted, or disubstituted with groups such as those listed herein.

The term "heteroaryl" as used herein refers to aromatic ring compounds containing 5 or more ring members, of which, one or more is a heteroatom such as, but not limited to, N, O, and S; for instance, heteroaryl rings can have 5 to about 8-12 ring members. A heteroaryl group is a variety of a heterocyclyl group that possesses an aromatic electronic structure. A heteroaryl group designated as a C$_2$-heteroaryl can be a 5-ring with two carbon atoms and three heteroatoms, a 6-ring with two carbon atoms and four heteroatoms and so forth. Likewise a C$_4$-heteroaryl can be a 5-ring with one heteroatom, a 6-ring with two heteroatoms, and so forth. The number of carbon atoms plus the number of heteroatoms sums up to equal the total number of ring atoms. A heterocyclyl ring designated C$_{x-y}$ can be any ring containing 'x' members up to 'y' members, including all intermediate integers between 'x' and 'y' and that contains one or more heteroatoms, as defined herein. In a ring designated $C_{x-y}$, all non-heteroatom members are carbon. Heterocyclyl rings designated $C_{x-y}$ can also be polycyclic ring systems, such as bicyclic or tricyclic ring systems. Heteroaryl groups include, but are not limited to, groups such as pyrrolyl, pyrazolyl, triazolyl, tetrazolyl, oxazolyl, isoxazolyl, thiazolyl, pyridinyl, thiophenyl, benzothiophenyl, benzofuranyl, indolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Heteroaryl groups can be unsubstituted, or can be substituted with groups as is discussed herein. Representative substituted heteroaryl groups can be substituted one or more times with groups such as those listed herein.

Additional examples of aryl and heteroaryl groups include but are not limited to phenyl, biphenyl, indenyl, naphthyl (1-naphthyl, 2-naphthyl), N-hydroxytetrazolyl, N-hydroxytriazolyl, N-hydroxyimidazolyl, anthracenyl(1-anthracenyl, 2-anthracenyl, 3-anthracenyl), thiophenyl(2-thienyl, 3-thienyl), furyl(2-furyl, 3-furyl), indolyl, oxadiazolyl, isoxazolyl, quinazolinyl, fluorenyl, xanthenyl, isoindanyl, benzhydryl, acridinyl, thiazolyl, pyrrolyl(2-pyrrolyl), pyrazolyl(3-pyrazolyl), imidazolyl(1-imidazolyl, 2-imidazolyl, 4-imidazolyl, 5-imidazolyl), triazolyl(1,2,3-triazol-1-yl, 1,2,3-triazol-2-yl 1,2,3-triazol-4-yl, 1,2,4-triazol-3-yl), oxazolyl(2-oxazolyl, 4-oxazolyl, 5-oxazolyl), thiazolyl(2-thiazolyl, 4-thiazolyl, 5-thiazolyl), pyridyl(2-pyridyl, 3-pyridyl, 4-pyridyl), pyrimidinyl(2-pyrimidinyl, 4-pyrimidinyl, 5-pyrimidinyl, 6-pyrimidinyl), pyrazinyl, pyridazinyl(3-pyridazinyl, 4-pyridazinyl, 5-pyridazinyl), quinolyl(2-quinolyl, 3-quinolyl, 4-quinolyl, 5-quinolyl, 6-quinolyl, 7-quinolyl, 8-quinolyl), isoquinolyl(1-isoquinolyl, 3-isoquinolyl, 4-isoquinolyl, 5-isoquinolyl, 6-isoquinolyl, 7-isoquinolyl, 8-isoquinolyl), benzo[b]furanyl(2-benzo[b]furanyl, 3-benzo[b]furanyl, 4-benzo[b]furanyl, 5-benzo[b]furanyl, 6-benzo[b]furanyl, 7-benzo[b]furanyl), 2,3-dihydro-benzo[b]furanyl(2-(2,3-dihydro-benzo[b]furanyl), 3-(2,3-dihydro-benzo[b]furanyl), 4-(2,3-dihydro-benzo[b]furanyl), 5-(2,3-dihydro-benzo[b]furanyl), 6-(2,3-dihydro-benzo[b]furanyl), 7-(2,3-dihydro-benzo[b]furanyl), benzo[b]thiophenyl(2-benzo[b]thiophenyl, 3-benzo[b]thiophenyl, 4-benzo[b]thiophenyl, 5-benzo[b]thiophenyl, 6-benzo[b]thiophenyl, 7-benzo[b]thiophenyl), 2,3-dihydro-benzo[b]thiophenyl, (2-(2,3-dihydro-benzo[b]thiophenyl), 3-(2,3-dihydro-benzo[b]thiophenyl), 4-(2,3-dihydro-benzo[b]thiophenyl), 5-(2,3-dihydro-benzo[b]thiophenyl), 6-(2,3-dihydro-benzo[b]thiophenyl), 7-(2,3-dihydro-benzo[b]thiophenyl), indolyl(1-indolyl, 2-indolyl, 3-indolyl, 4-indolyl, 5-indolyl, 6-indolyl, 7-indolyl), indazole (1-indazolyl, 3-indazolyl, 4-indazolyl, 5-indazolyl, 6-indazolyl, 7-indazolyl), benzimidazolyl(1-benzimidazolyl, 2-benzimidazolyl, 4-benzimidazolyl, 5-benzimidazolyl, 6-benzimidazolyl, 7-benzimidazolyl, 8-benzimidazolyl), benzoxazolyl(1-benzoxazolyl, 2-benzoxazolyl), benzothiazolyl(1-benzothiazolyl, 2-benzothiazolyl, 4-benzothiazolyl, 5-benzothiazolyl, 6-benzothiazolyl, 7-benzothiazolyl), carbazolyl(1-carbazolyl, 2-carbazolyl, 3-carbazolyl, 4-carbazolyl), 5H-dibenz[b,f]azepine (5H-dibenz[b,f]azepin-1-yl, 5H-dibenz[b,f]azepine-2-yl, 5H-dibenz[b,f]azepine-3-yl, 5H-dibenz[b,f]azepine-4-yl, 5H-dibenz[b,f]azepine-5-yl), 10,11-dihydro-5H-dibenz[b,f]azepine (10,11-dihydro-5H-dibenz[b,f]azepine-1-yl, 10,11-dihydro-5H-dibenz[b,f]azepine-2-yl, 10,11-dihydro-5H-dibenz[b,f]azepine-3-yl, 10,11-dihydro-5H-dibenz[b,f]azepine-4-yl, 10,11-dihydro-5H-dibenz[b,f]azepine-5-yl), and the like.

The term "heterocyclylalkyl" as used herein refers to alkyl groups as defined herein in which a hydrogen or carbon bond of an alkyl group as defined herein is replaced with a bond to a heterocyclyl group as defined herein. Representative heterocyclyl alkyl groups include, but are not limited to, furan-2-yl methyl, furan-3-yl methyl, pyridine-3-yl methyl, tetrahydrofuran-2-yl ethyl, and indol-2-yl propyl.

The term "heteroarylalkyl" as used herein refers to alkyl groups as defined herein in which a hydrogen or carbon bond of an alkyl group is replaced with a bond to a heteroaryl group as defined herein.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include about 1 to about 12, about 1 to about 20, or about 1 to about 40 carbon atoms bonded to the oxygen atom, and can further include double or triple bonds, and can also include heteroatoms. For example, an allyloxy group or a methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula $N(group)_3$ wherein each group can independently be H or non-H, such as alkyl, aryl, and the like. Amines include but are not limited to $R-NH_2$, for example, alkylamines, arylamines, alkylarylamines; $R_2NH$ wherein each R is independently selected, such as dialkylamines, diarylamines, aralkylamines, heterocyclylamines and the like; and $R_3N$ wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form $-NH_2$, $-NHR$, $-NR_2$, $-NR_3^+$, wherein each R is independently selected, and protonated forms of each, except for $-NR_3^+$, which cannot be protonated. Accordingly, any compound substituted with an amino group can be viewed as an amine. An "amino group" within the meaning herein can be a primary, secondary, tertiary, or quaternary amino group. An "alkylamino" or "aminoalkyl" group includes a monoalkylamino, dialkylamino, and trialkylamino group. The amine in an aminoalkyl group of two or more carbons can be a substituted on the alkyl chain such as, for example $-CH_2CH(NH_2)CH_3$, or in the alkyl chain, such as, for example, $-CH_2-NH-CH_2-CH_3$.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like. A "haloalkoxy" group, as used herein, is an alkoxy group that is substituted with one or more halogen atoms as in a haloalkyl group.

The terms "epoxy-functional" or "epoxy-substituted" as used herein refers to a functional group in which an oxygen atom, the epoxy substituent, is directly attached to two adjacent carbon atoms of a carbon chain or ring system. Examples of epoxy-substituted functional groups include, but are not limited to, 2,3-epoxypropyl, 3,4-epoxybutyl, 4,5-epoxypentyl, 2,3-epoxypropoxy, epoxypropoxypropyl, 2-glycidoxyethyl, 3-glycidoxypropyl, 4-glycidoxybutyl, 2-(glycidoxycarbonyl)propyl, 3-(3,4-epoxycylohexyl)propyl, 2-(3,4-epoxycyclohexyl)ethyl, 2-(2,3-epoxycylopentyl)ethyl, 2-(4-methyl-3,4-epoxycyclohexyl)propyl, 2-(3,4-epoxy-3-methylcylohexyl)-2-methylethyl, and 5,6-epoxyhexyl.

The term "monovalent" as used herein refers to a substituent connecting via a single bond to a substituted molecule. When a substituent is monovalent, such as, for example, F or Cl, it is bonded to the atom it is substituting by a single bond.

The term "hydrocarbon" or "hydrocarbyl" as used herein refers to a molecule or functional group that includes carbon and hydrogen atoms. The term can also refer to a molecule or functional group that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof. Hydrocarbyl groups can be shown as $(C_a-C_b)$hydrocarbyl, wherein a and b are integers and mean having any of a to b number of carbon atoms. For example, $(C_1-C_4)$hydrocarbyl means the hydrocarbyl group can be methyl($C_1$), ethyl($C_2$), propyl($C_3$), or butyl($C_4$), and $(C_0-C_b)$hydrocarbyl means in certain embodiments there is no hydrocarbyl group.

The term "solvent" as used herein refers to a liquid that can dissolve a solid, liquid, or gas. Non-limiting examples of solvents are silicones, organic compounds, water, alcohols, ionic liquids, and supercritical fluids.

As used herein, the term "(meth)acrylate" refers to a compound comprises at least one methacrylate functionality, at least one acrylate functionality, and any combinations thereof. In certain embodiments, the meth(acrylate" comprises multiple (meth)acrylate functionalities and/or multiple acrylate functionalities, or any combinations thereof.

The term "monomer" refers to any discreet chemical compound of any molecular weight.

As used herein, the term "polymer" refers to a molecule composed of repeating structural units typically connected by covalent chemical bonds. The term "polymer" is also meant to include the terms copolymer and oligomers. In certain embodiments, a polymer comprises a backbone (i.e., the chemical connectivity that defines the central chain of the polymer, including chemical linkages among the various polymerized monomeric units) and a side chain (i.e., the chemical connectivity that extends away from the backbone). The term "oligomer" in certain embodiments refers to 0 to 20, 0 to 1, or 0 to 2 repeating units.

As used herein, the term "polymerization" or "crosslinking" refers to at least one reaction that consumes at least one functional group in a monomeric molecule (or monomer), oligomeric molecule (or oligomer) or polymeric molecule (or polymer), to create at least one chemical linkage between at least two distinct molecules (e.g., intermolecular bond), at least one chemical linkage within the same molecule (e.g., intramolecular bond), or any combinations thereof. A polymerization or crosslinking reaction may consume between about 0% and about 100% of the at least one functional group available in the system. In certain embodiments, polymerization or crosslinking of at least one functional group results in about 100% consumption of the at least one functional group. In other embodiments, polymerization or crosslinking of at least one functional group results in less than about 100% consumption of the at least one functional group.

As used herein, the term "reaction condition" refers to a physical treatment, chemical reagent, or combination thereof, which is required or optionally required to promote a reaction. Non-limiting examples of reaction conditions are electromagnetic radiation (such as, but not limited to visible light and UV light), heat, a catalyst, a chemical reagent (such as, but not limited to, an acid, base, electrophile or nucleophile), and a buffer.

"Instructional material" as that term is used herein includes a publication, a recording, a diagram, or any other medium of expression that can be used to communicate the usefulness of the composition and/or compound of the disclosure in a kit. The instructional material of the kit may, for example, be affixed to a container that contains the compound and/or composition of the disclosure or be shipped together with a container that contains the compound and/or composition.

The term "independently selected from" as used herein refers to referenced groups being the same, different, or a mixture thereof, unless the context clearly indicates otherwise. Thus, under this definition, the phrase "$X^1$, $X^2$, and $X^3$ are independently selected from noble gases" would include the scenario where, for example, $X^1$, $X^2$, and $X^3$ are all the same, where $X^1$, $X^2$, and $X^3$ are all different, where $X^1$ and $X^2$ are the same but $X^3$ is different, and other analogous permutations.

The term "room temperature" as used herein refers to a temperature of about 15° C. to 28° C.

The term "standard temperature and pressure" as used herein refers to 20° C. and 101 kPa.

Compositions of Interpenetrating Polymer Networks

A. Vinyl and Epoxy Dual Functional Monomers and Polymers

Compounds of Formula I or Formula I-A or otherwise described herein can be prepared by the general schemes described herein, using the synthetic method known by those skilled in the art. The compound of Formula I is, in some embodiments, a polymer or resin. The following examples illustrate non-limiting embodiments of the compound(s) described herein and their preparation.

Formula I

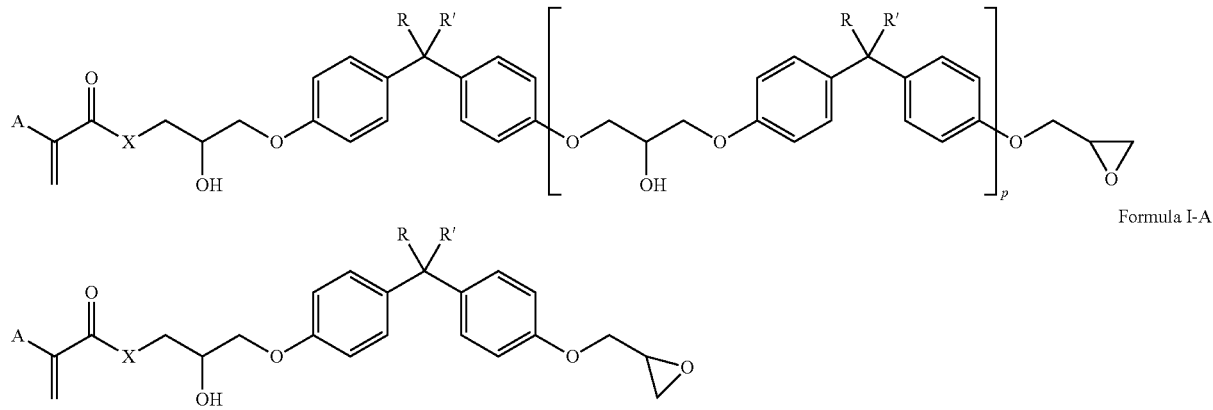

Formula I-A

Independently in the compounds of Formula I and Formula I-A:
- A is selected from the group consisting of H, $C_{1-3}$ alkyl, CN, F, Cl, and perfluorinated $C_{1-3}$ alkyl;
- X is O or N—R";
- each occurrence of R is independently selected from the group consisting of H, $C_{1-3}$ alkyl, F, and perfluorinated $C_{1-3}$ alkyl;
- each occurrence of R' is independently selected from the group consisting of H, $C_{1-3}$ alkyl, F, and perfluorinated $C_{1-3}$ alkyl;
- R" is H or $C_{1-3}$ alkyl;
- p is an integer from 0 to 100,000.

By "perfluorinated $C_{1-3}$ alkyl" it is meant that each hydrogen in the $C_{1-3}$ alkyl group is replaced by a F (fluorine) atom. In various embodiments, A is $CH_3$. In various embodiments, X is O. In various embodiments, R is $CH_3$. In various embodiments, 'p' is an integer from 0 to 1, 0 to 2, 0 to 20, 100 to 100,000, or 1000 to 100,000. In various embodiments R' is $CH_3$. In various embodiments, the compound of Formula I has the structure:

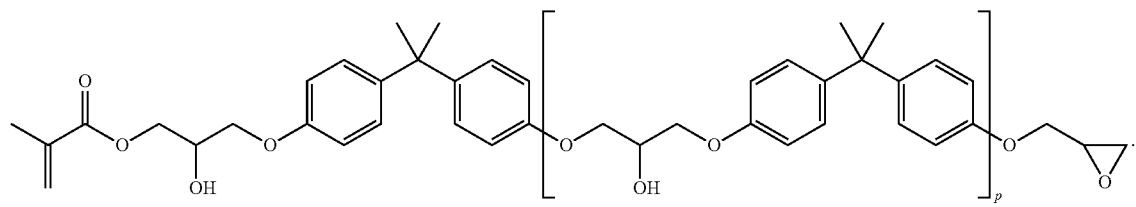

In various embodiments, the compound of Formula I-A has the structure:

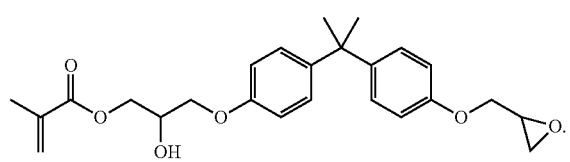 [SMILES: C=C(C)C(=O)OCC(O)COc1ccc(C(C)(C)c2ccc(OCC3CO3)cc2)cc1]

In various embodiments, an interpenetrating polymer network (IPN) comprising the reaction product of at least one amine and a compound that includes at least one vinyl ester functionality and at least one epoxy functionality. The compound that includes at least one vinyl ester functionality and at least one epoxy functionality can be a monomer, polymer, or a combination thereof. The IPN is formed when the at least one vinyl ester functionality is polymerized by photo-induced, free radical polymerization, and wherein the at least one epoxy functionality and the amine are polymerized by thermal step-growth polymerization.

In various embodiments, the compound that includes at least one vinyl ester functionality and at least one epoxy functionality has the structure of Formula I, Formula I-A, or Formula III-A, and combinations thereof. In various embodiments, the vinyl ester functionality in the compounds of Formula I, Formula I-A, or Formula III-A is photopolymerized using VPP. In various embodiments, the at least one amine is an aromatic diamine. In various embodiments, the epoxy-amine polymerization is promoted using thermal post-processing by exposure to thermal radiation such as heat under any of the thermal conditions described herein. In various embodiments, the IPN has a tensile stress at break of about 32 to about 40 MPa. In various embodiments, the IPN has a tensile strain at break of about 0.85 to about 0.97%. In various embodiments, the IPN composition further includes

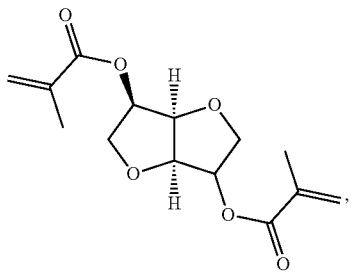
(IM)

or a crosslinked product thereof.

The IM can be crosslinked to any other vinyl(double bond) group in the IPN during, before, or after the formation of the IPN. Thus, for example, the IM can be crosslinked to itself and to a compound of Formula I, Formula I-A, Formula II, Formula III, or Formula III-A, and combinations thereof.

B. Bio-Based Monomers, Polymers, and Resins

Figure 10:
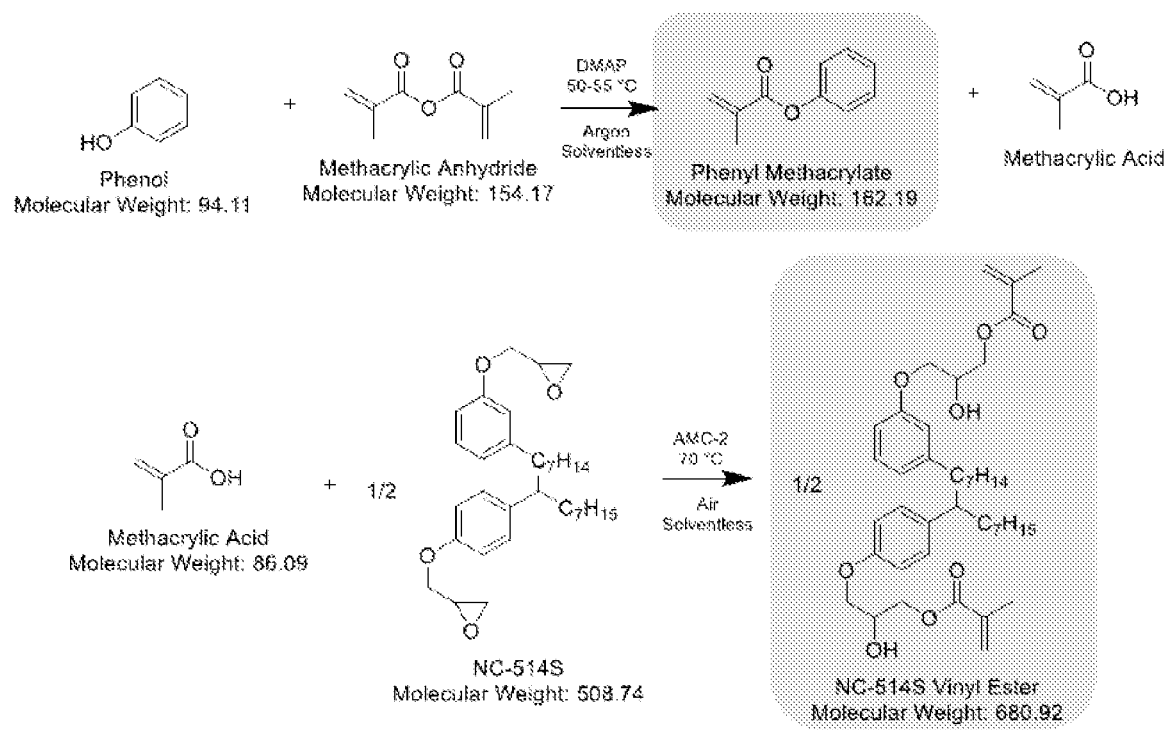
FIG. 10 is a schematic showing two-step, one-pot synthesis of compounds of Formula III, according to various embodiments.

In various embodiments, monomers of Formula II, Formula III, Formula III-A, or Formula IV can be polymerized to form bio-based polymers having tailorable processing, thermal, and mechanical properties. The monomers are derived from such naturally occurring biomolecules as lignin, cardanol (derived from cashew nutshell liquid), and carbohydrates such as isosorbide. The bio-based polymers can be advantageously synthesized using a one-pot two-step procedure (FIG. 10). In one embodiment, the synthesis of the bio-based polymers described herein uses no solvent or substantially no solvent. In various embodiments, the synthesis of the bio-based polymers described herein results in the formation of no byproducts and does not require a work-up. In various embodiments, the synthesis of the bio-based polymers described herein is at least, about, or greater than about 98%, 99%, 99.5%, 99.9%, 99.99% atom efficient. In various embodiments, the synthesis of the bio-based polymers described herein has an atom efficiency of 100%. In one embodiment, the one-pot synthesis scheme was performed to prepare a resin containing phenyl methacrylate (PM) and NC-514sVE (NC-514 s Vinyl Ester) in a 1 to 0.5 mole ratio.

In one embodiment, the monomers of Formula II, Formula III, Formula III-A, and Formula IV have the following structures:

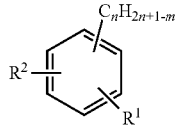
Formula II

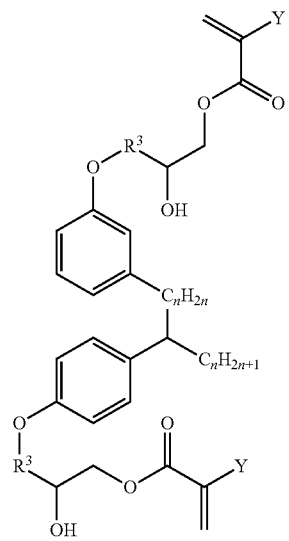
Formula III

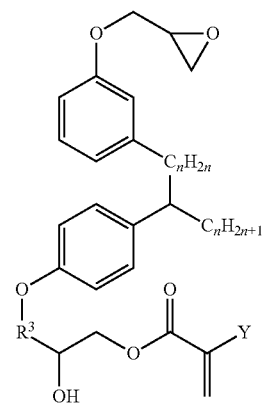
Formula III-A

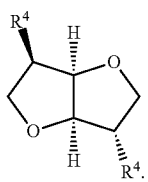
Formula IV wherein:
R$^1$ is

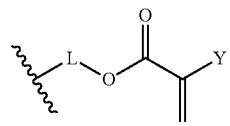

L is selected from the group consisting of a bond, $C_1$-$C_6$ alkyl, $C_2$-$C_6$ alkenyl, and $C_2$-$C_6$ alkynyl;

$R^2$ is selected from the group consisting of optionally substituted $C_1$-$C_6$ alkyl, optionally substituted $C_2$-$C_6$ alkenyl, and optionally $C_2$-$C_6$ alkynyl, wherein the substituents are selected from the group consisting of optionally substituted aryl and optionally substituted heteroaryl;

each instance of $R^3$ is independently selected from the group consisting of optionally substituted $C_1$-$C_6$ alkyl, optionally substituted $C_2$-$C_6$ alkenyl, optionally $C_2$-$C_6$ alkynyl;

$R_4$ is

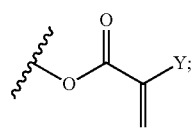

each instance of Y is independently selected from the group consisting of optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, and optionally $C_1$-$C_6$ haloalkyl;

n is 5, 6, 7, 8, 9, 10, 11, 12, 13, 14, 15, 16, 17, 18, 19, or 20;

m is 0, 2, 4, 6, or 8.

In certain embodiments, the monomer of Formula II is selected from the group consisting of:

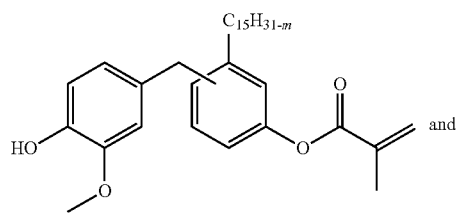

wherein m is 0, 2, 4 or 6.

In certain embodiments the monomer of Formula II is a phenyl (meth)acrylate or an optionally substituted phenyl methacrylate.

In certain embodiments, the monomer of Formula III is:

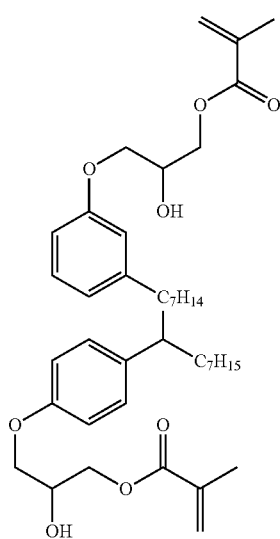

In certain embodiments, the monomer of Formula III is 2-hydroxy-3-(3-(8-(4-(2-hydroxy-3-(methacryloyloxy)propoxy)phenyl)pentadecyl)phenoxy)propyl methacrylate.

In certain embodiments, the monomer of Formula IV is:

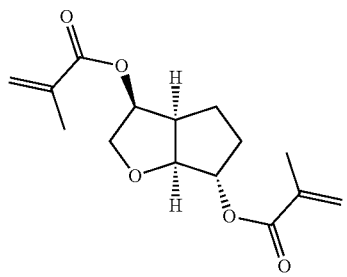 [SMILES: C=C(C)C(=O)O[C@H]1CC[C@H]2[C@@H]1OC[C@H]2OC(=O)C(=C)C]

In certain embodiments, the monomer of Formula IV is (3R,3aR,6 S,6aR)-hexahydrofuro[3,2-b]furan-3,6-diyl bis(2-methylacrylate). The monomer of Formula IV is also known as isosorbide dimethacrylate (IM).

Compounds of Formula III-A can be prepared by the methods described herein as well as art-recognized methods. In various embodiments, the compound of Formula III-A can be prepared in a manner analogous to that of the preparation of the compound of Formula I, such as according to reaction Scheme 1:

Scheme 1

Step 1:

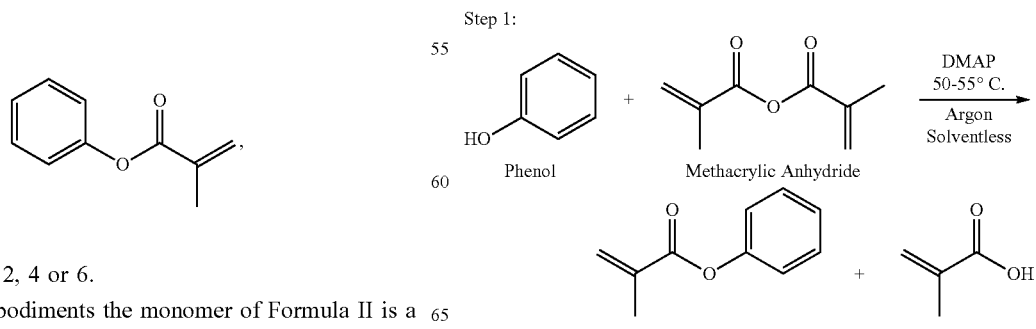

Phenol + Methacrylic Anhydride → Phenyl Methacrylate (PM) + Methacrylate Acid

DMAP
50-55° C.
Argon
Solventless

Step 2:

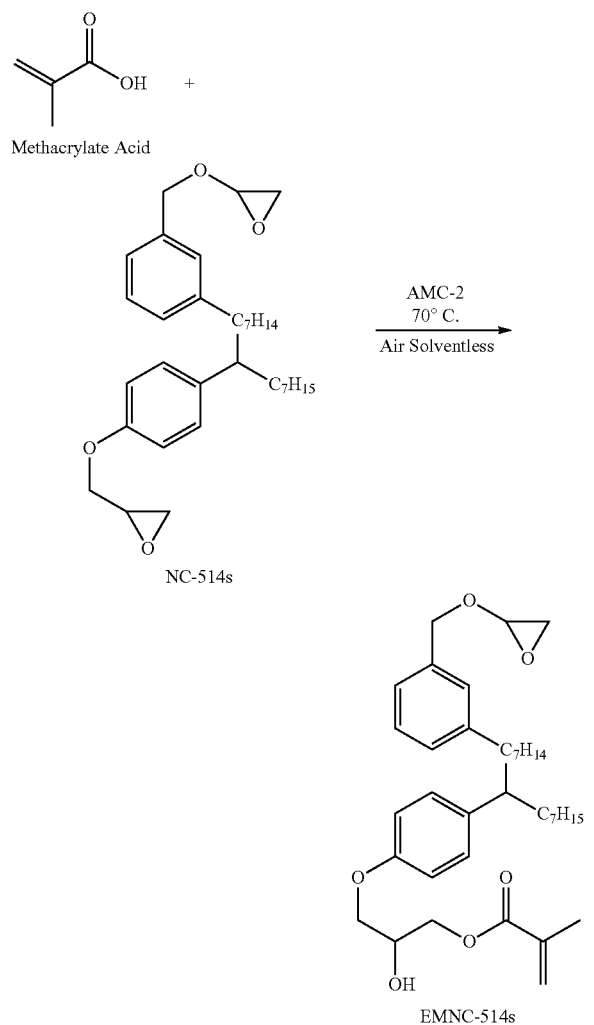

in the presence of amines that are blocked with acid labile groups, such as t-butyl carbamate, or with carbamates that are both acid and base stable but hydrolytically removable.

In certain embodiments, carboxylic acid and hydroxy reactive moieties are blocked with hydrolytically removable protective groups such as the benzyl group, while amine groups capable of hydrogen bonding with acids are blocked with base labile groups such as Fmoc. Carboxylic acid reactive moieties are protected by conversion to simple ester compounds as exemplified herein, which include conversion to alkyl esters, or are blocked with oxidatively-removable protective groups such as 2,4-dimethoxybenzyl, while co-existing amino groups are blocked with fluoride labile silyl carbamates.

Allyl blocking groups are useful in the presence of acid- and base-protecting groups since the former are stable and are subsequently removed by metal or pi-acid catalysts. For example, an allyl-blocked carboxylic acid is deprotected with a palladium-catalyzed reaction in the presence of acid labile t-butyl carbamate or base-labile acetate amine protecting groups. Yet another form of protecting group is a resin to which a compound or intermediate is attached. As long as the residue is attached to the resin, that functional group is blocked and does not react. Once released from the resin, the functional group is available to react.

Typically blocking/protecting groups may be selected from:

Compounds described herein are synthesized using any suitable procedures starting from compounds that are available from commercial sources, or are prepared using procedures described herein.

In certain embodiments, reactive functional groups, such as hydroxyl, amino, imino, thio or carboxy groups, are protected in order to avoid their unwanted participation in reactions. Protecting groups are used to block some or all of the reactive moieties and prevent such groups from participating in chemical reactions until the protective group is removed. In other embodiments, each protective group is removable by a different means. Protective groups that are cleaved under totally disparate reaction conditions fulfill the requirement of differential removal.

In certain embodiments, protective groups are removed by acid, base, reducing conditions (such as, for example, hydrogenolysis), and/or oxidative conditions. Groups such as trityl, dimethoxytrityl, acetal and t-butyldimethylsilyl are acid labile and are used to protect carboxy and hydroxy reactive moieties in the presence of amino groups protected with Cbz groups, which are removable by hydrogenolysis, and Fmoc groups, which are base labile. Carboxylic acid and hydroxy reactive moieties are blocked with base labile groups such as, but not limited to, methyl, ethyl, and acetyl,

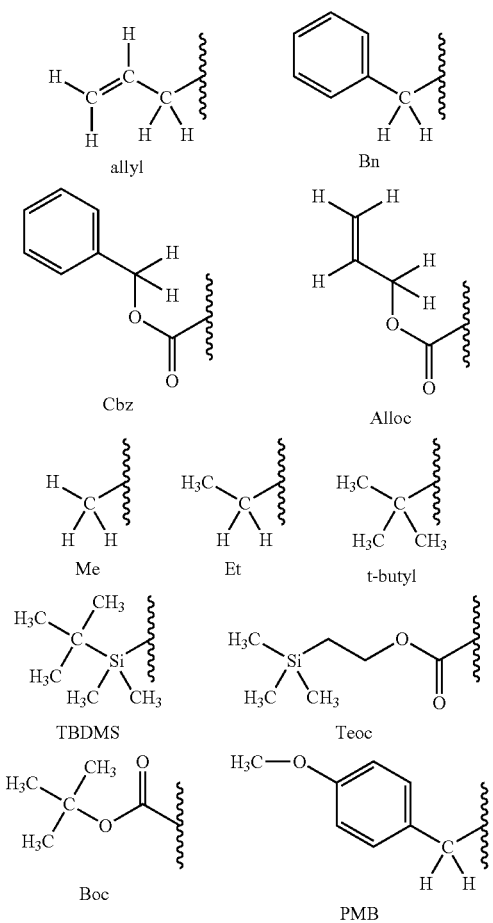

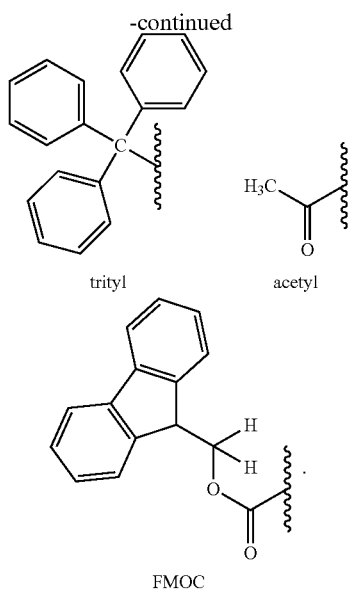

trityl acetyl

FMOC

Other protecting groups, plus a detailed description of techniques applicable to the creation of protecting groups and their removal are described in Greene & Wuts, Protective Groups in Organic Synthesis, 3rd Ed., John Wiley & Sons, New York, NY, 1999, and Kocienski, Protective Groups, Thieme Verlag, New York, NY, 1994, which are incorporated herein by reference for such disclosure.

Methods of Making IPNs

A. Vinyl and Epoxy Dual Functional Monomers, Polymers, and Resins as IPN Precursors In various embodiments, a method of preparing an interpenetrating polymer network (IPN) is provided. The method includes:

applying vat photopoloymerization (VPP) to a mixture of a crosslinker and a monomer, oligomer, or polymer bearing at least one vinyl ester functionality and at least one epoxy functionality under conditions whereby the vinyl ester functionality is photopolymerized; and exposing the resulting mixture to thermal conditions whereby epoxy-amine polymerization takes place.

In various embodiments, the monomer or polymer bearing at least one vinyl ester functionality and at least one epoxy functionality includes compounds of Formula I, Formula I-A, Formula III-A, and combinations thereof. The method includes performing stereolithography on a mixture that can optionally contain additional agents such as photoinitiators that promote free radical polymerization of vinyl groups, and thermal initiators that promote thermal polymerization of epoxy and amine groups. The mixture can additionally include compounds of Formula II, Formula III, and Formula IV, or mixtures thereof. In various embodiments, the stereolithography is performed in the absence of solvent. Advantageously, no solvent is necessary to perform the methods described herein. In various embodiments, the exposing step is performed in situ. Thus, the formation of the IPN can take place in a so-called one-pot two-step process in which the reactive components are not transferred to another container or otherwise purified after the photoinitiated polymerization (stereolithography) is complete. n various embodiments, the formation of the IPNs described herein results in the formation of no byproducts and does not require a work-up.

In various embodiments, a composite material that includes the IPNs described herein is provided. Composite materials that can suitably include the IPNs described herein include, but are not limited to, automotive composites, composites for boating, composites for aircraft, automotive coatings, powder coatings, radiation curable coatings, waterborne coatings resins, industrial & protective finishes, appliance & hardware finishes, and the like.

In various embodiments, a first crosslinked product of the compound of Formula I or Formula I-A is provided. The first crosslinked product can be obtained by using, for example, VPP. The first crosslinked product of the compound of Formula I or Formula I-A can be obtained, in some embodiments, by photopolymerization with a photoinitiator. In certain embodiments, the photoinitiator is reactive upon exposure to light in the IR (700-1,000,000 nm), visible (400-700 nm) or UV (10-400 nm) range. In various embodiments, the photoinitiator is a compound belonging to a class selected from the group consisting of acyl phosphines, ketones, diimidazoles, acyl germaniums, thioketones, dithiocarbonates, trithiocarbonates, camphorquinones and camphoramines. Suitable photoinitiators include, but are not limited to, 1-hydroxy-cyclohexylphenyl ketone (HCPK), 2-hydroxy-2-methyl-1-phenyl-1-propanone (HMPP), diphenyl(2,4,6-trimethylbenzoyl)-phosphine oxide (TPO), phenylbis(2,4,6-trimethylbenzoyl) phosphine oxide (BAPO), acetophenone, benzophenone, 2-phenylacetophenone, 2,2-dimethoxy-2-phenylacetophenone, 2-hydroxy-4'-(2-hydroxyethoxy)-2-methylpropiophenone, 2-methyl-(4-methylthienyl)-2-morpholinyl-1-propan-1-one, ethyl(2,4,6-trimethylbenzoyl)phenyl phosphinate, lithium phenyl-2,4,6-trimethylbenzoylphosphinate,

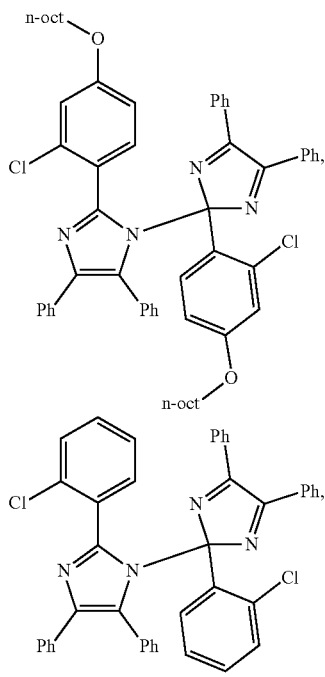

and the like. The photoinitator can be used in an amount of about 0.01 to about 5 wt % relative to the formulated mass containing the compound of Formula I or Formula I-A. In various embodiments, the photoinitator is present in an amount of about 0.01, 0.02, 0.04, 0.06, 0.08, 0.1, 0.2, 0.4, 0.6, 0.8, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, or about 5 wt % relative to the formulated mass containing the compound of Formula I. In various embodiments, the photoinitiator is TPO. In various embodiments, the photoinitiator is present in an amount of about 1.0 to about 3.0 wt % relative to the formulated mass containing the compound of Formula I or Formula I-A.

In various embodiments, the formulated mass containing the compound of Formula I or Formula I-A includes the compound of Formula I or Formula I-A, at least one photoinitiator, and at least one amine crosslinker capable of crosslinking the epoxy groups. In various embodiments, the formulated mass containing the compound of Formula I or Formula I-A is free of solvent. In various embodiments, the compound of Formula I or Formula I-A is present in the formulated mass in an amount of about 1 to about 99% by weight, or at least, about, or greater than about 1, 5, 10, 15, 20, 25, 30, 35, 40, 45, 50, 55, 60, 65, 70, 75, 80, 85, 90, 95, 97, 98, or 99% by weight relative to the formulated mass containing the compound of Formula I or Formula I-A.

The crosslinker includes, in various embodiments, at least one epoxy curing group. Suitable epoxy curing groups include amines, thiols, and the like. The crosslinker can, in some embodiments, have one, two, three, or four amine groups. The crosslinker can, in some embodiments, have one, two, three, or four thiol groups. Crosslinkers can also have more than one type of epoxy curing group in the same molecule, for example a crosslinker can have an amine and a thiol group in the same molecule. In various embodiments, the amine is an epoxy curing agent. In various embodiments, the crosslinker is an aromatic diamine. Suitable amine crosslinkers include, but are not limited to, 2,4-diethyl-5-methylbenzene-1,3-diamine (sold under the trade name EPI-KURE™ W), 4,4-diaminodiphenyl methane (DDM), m-xylenediamine (m-XDA), and the like, or combinations thereof. Suitable thiol crosslinkers include, but are not limited to, pentaerythritol tetrakis(3-mercaptopropionate), trimethylolpropane tris(3-mercaptopropionate), 2,2'-(ethylenedioxy)diethanethiol, and the like, and combinations thereof. In various embodiments, suitable crosslinking agents can include (4,4-diaminodicyclohexylmethane), phenalkamines, polyetheramines, diethylenetriamine, isophorone diamine, substituted dianilines, anyhydride epoxy curing agents, and the like, and combinations thereof. In various embodiments, the amine crosslinker is capable of crosslinking the epoxide moieties in the compound of Formula I or Formula I-A. The amine crosslinker can be present in an amount of about 1 to about 50 wt % relative to the formulated mass containing the compound of Formula I or Formula I-A. In various embodiments, the amine crosslinker can be present in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or about 50 wt % relative to the formulated mass containing the compound of Formula I.

In various embodiments, the first crosslinked product contains crosslinks between the vinyl(alkene) moieties in the compound of Formula I or Formula I-A and is substantially free of crosslinking between the epoxide moieties in the compound of Formula I or Formula I-A. In various embodiments, crosslinking of the vinyl moieties can be initiated can be initiated by light having a wavelength of about 200 nm to about 400 nm.

In various embodiments, the final resin can be formed by thermally curing the formulated mass containing the compound of Formula I or Formula I-A by exposing the formulation to heat. In various embodiments, the heat is a temperature of about 80 to about 220° C. In various embodiments, the heat is about 80, 90, 100, 110, 120, 130, 140, 150, 160, 170, 180, 190, 200, 210, or about 220° C. Thermally curing includes, in various embodiments, exposing the formulation containing the compound of Formula I or Formula I-A to heat for about 0.5 to about 4 hours, or 0.5, 1, 1.5, 2, 2.5, 3, 3.5, or about 4 hours.

In various embodiments the final resin has a tensile strain at break of at least about 0.85%. In various embodiments, the final resin has a tensile strain at break of about 0.85 to about 0.97%. In various embodiments, the final resin has a tensile strain at break of about, or at least about 0.85, 0.86, 0.87, 0.88, 0.89, 0.9, 0.91, 0.92, 0.93, 0.94, 0.95, 0.96, or about 0.97%.

In various embodiments, the final resin has a tensile stress at break of at least about 32 MPa. In various embodiments, the final resin has a tensile stress at break of about 32 to about 40 MPa. In various embodiments, the final resin has a tensile stress at break of about or at least about 32, 32.5, 33, 33.5, 34, 34.5, 35, 35.5, 36, 36.5, 37, 37.5, 38, 38.5, 39, 39.5, or about 40 MPa.

In various embodiments, the resin prior to VPP of the compound of Formula I or Formula I-A as described herein has a viscosity of about 250 to about 5000 cPs at room temperature, or a viscosity of about 250, 500, 750, 1000, 1200, 1400, 1600, 1800, 2000, 2200, 2400, 2600, 2800, 3000, 3200, 3400, 3600, 3800, 4000, 4200, 4400, 4600, 4800 or about 5000 cPs at room temperature.

B. Bio-Based Monomers, Polymers, and Resins

Compounds of Formula III-A can be used to prepare IPNs using the same procedures, amounts, conditions, and reagents as used with the compound of Formula I, as described herein.

In certain embodiments, the monomers, polymers, and combinations thereof described herein are useful for a wide array of applications such as, for example, automotive composites, composites for boating, composites for aircraft, automotive coatings, powder coatings, radiation curable coatings, waterborne coatings resins, industrial & protective finishes, appliance & hardware finishes, adhesives, electrical laminates, plastic modifiers (PVC (polyvinyl chloride), PET (polyethylene terephthalate), engineering thermoplastics, rubbers), 3D printing resins, VPP printing resins, and additive manufacturing. In other embodiments, the monomers, polymers, and combinations thereof described herein can be used as additives in the manufacturing of mono-functional oligomers and polymers such that they form an end-cap on the oligomers and polymers, thereby adding dual functionality to the oligomers and polymers.

In various embodiments, prior to the VPP with the compound of Formula III-A, a formulated mass containing the compound of Formula III-A is provided, which includes the compound of Formula III-A, at least one photoinitiator, and at least one amine crosslinker capable of crosslinking the epoxy groups. In various embodiments, the formulated mass containing the compound of Formula III-A is free of solvent. In various embodiments, the compound of Formula III-A is present in the formulated mass in an amount of about 1 to about 99% by weight, or at least, about, or greater than about 1, 5, 10, 15, 20, 25, 30, 35, 40, 45, 50, 55, 60, 65, 70, 75, 80, 85, 90, 95, 97, 98, or 99% by weight relative to the formulated mass containing the compound of Formula III-A. The formulated mass containing the compound of Formula III-A can optionally include at least one compound of Formula II, Formula III, Formula IV, and combinations thereof. The formulated mass can also optionally include a thermal initiator, a redox initiator, and combinations thereof.

In various embodiments, the photoinitiator is selected from a group consisting of acetophenone, benzophenone, 2-phenylacetophenone, 2,2-dimethoxy-2-phenylacetophenone, bis(2,4,6-trimethylbenzoyl)-phenylphosphineoxide, 2-hydroxy-4'-(2-hydroxyethoxy)-2-methylpropiophenone, 2-methyl-(4-methylthienyl)-2-morpholinyl-1-propan-1-one, diphenyl(2,4,6-trimethylbenzoyl)phosphine oxide, ethyl(2,4,6-trimethylbenzoyl)phenyl phosphinate, lithium phenyl-2,4,6-trimethylbenzoylphosphinate,

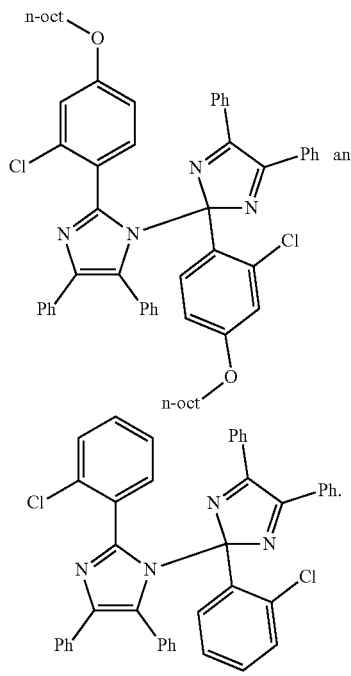

In various embodiments, the thermal initiator is selected from the group consisting of 4,4'-diaminodicyclohexyl methane, tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, methyl ethyl ketone peroxide, cyclohexanone peroxide, dicumyl peroxide, lauroyl peroxide, 2,4-pentanedione peroxide, peracetic acid, and potassium persulfate.

In various embodiments, the redox initiator is selected from a group consisting of sodium iodide/hydrogen peroxide, potassium iodide/hydrogen peroxide, benzoyl peroxide/dimethyaniline, benzoyl peroxide/N,N-dimethyl p-toluidine, benzoyl peroxide/4-N,N-dimethylaminophenethyl alcohol, benzoyl peroxide/ethyl 4-dimethylaminobenzoate, glucose oxidase/oxygen/iron(II) sulfate and copper(II) sulfate/sodium ascorbate.

In various embodiments, the monomer of Formula III can be about 1 to about 99% of the formulated mass, or about 50% to about 85% of weight of the composition. In various embodiments, the monomer of Formula III can be at least, about, or greater than about 1, 5, 10, 15, 20, 25, 30, 35, 40, 45, 50, 55, 60, 65, 70, 75, 80, 85, 90, 95, 97, 98, or 99% by weight relative to the formulated mass containing the compound of Formula III-A.

In various embodiments, the monomer of Formula II can be about 1 to about 99% of the formulated mass, or about 15% to about 30% of weight of the composition. In various embodiments, the monomer of Formula II can be at least, about, or greater than about 1, 5, 10, 15, 20, 25, 30, 35, 40, 45, 50, 55, 60, 65, 70, 75, 80, 85, 90, 95, 97, 98, or 99% by weight relative to the formulated mass containing the compound of Formula III-A.

In various embodiments, the monomer of Formula IV can be about 1 to about 99% of the formulated mass, or about 1% to about 40% of weight of the formulated mass. In various embodiments, the monomer of Formula IV can be at least, about, or greater than about 1, 5, 10, 15, 20, 25, 30, 35, 40, 45, 50, 55, 60, 65, 70, 75, 80, 85, 90, 95, 97, 98, or 99% by weight relative to the formulated mass containing the compound of Formula III-A.

In various embodiments, the formulated mass containing the compound of Formula III-A is photocurable within about 0-20 seconds, or in about 0, 1, 2, 3, 4, 5, 6, 7, 8, 9, 10, 11, 12, 13, 14, 15, 16, 17, 18, 19, or 20 seconds. In various embodiments, the resin prior to VPP of the compound of Formula III-A as described herein has a viscosity of about 250 to about 5000 cPs at room temperature, or a viscosity of about 250, 500, 750, 1000, 1200, 1400, 1600, 1800, 2000, 2200, 2400, 2600, 2800, 3000, 3200, 3400, 3600, 3800, 4000, 4200, 4400, 4600, 4800 or about 5000 cPs at room temperature.

In various embodiments the final resin containing compounds of Formula III-A and optionally compounds of Formula II, Formula III, Formula IV, or combinations thereof, has a tensile strain at break of at least about 0.65%. In various embodiments, the final resin has a tensile strain at break of about 0.65 to about 0.97%. In various embodiments, the final resin has a tensile strain at break of about, or at least about 0.65, 0.66, 0.67, 0.68, 0.69, 0.7, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.9, 0.91, 0.92, 0.93, 0.94, 0.95, 0.96, or about 0.97%.

In various embodiments, the final resin has a tensile stress at break of at least about 25 MPa. In various embodiments, the final resin has a tensile stress at break of about 32 to about 40 MPa, or about 25 MPa to about 40 MPa. In various embodiments, the final resin has a tensile stress at break of about or at least about 25, 25.5, 26, 26.5, 27, 27.5, 28, 28.5, 29, 29.5, 30, 31.5, 32, 32.5, 33, 33.5, 34, 34.5, 35, 35.5, 36, 36.5, 37, 37.5, 38, 38.5, 39, 39.5, or about 40 MPa.

Kits

In further aspect, a kit is provided containing one or more compounds described herein is provided. In certain embodiments, the kit includes a composition containing at least one monomer of Formula I, a monomer of Formula I-A, at least one monomer selected from the group consisting of a monomer of Formula II, a monomer of Formula III, a monomer of Formula III-A, and a monomer of Formula IV, and combinations thereof, and instructional material for use thereof. In certain embodiments, the composition further comprises at least one polymerization initiator.

In certain embodiments, the kit further comprises a light source capable of producing light sufficient to activate a photo polymerization initiator. In other embodiments, the kit further comprises a light source capable of emitting light in the IR (700-1,000,000 nm), visible (400-700 nm) or UV (10-400 nm) ranges. In yet other embodiments, the kit further comprises a heat source capable of producing heat sufficient to activate a thermal polymerization initiator. In other embodiments, the kit further comprises a heat source capable of heating a composition of the disclosure to a temperature of about 30° C. to about 200° C.

Those skilled in the art will recognize, or be able to ascertain using no more than routine experimentation, numerous equivalents to the specific procedures, embodiments, claims, and examples described herein. Such equivalents were considered to be within the scope of this disclosure and covered by the claims appended hereto. For example, it should be understood, that modifications in reaction conditions, including, but not limited to, reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present disclosure. Moreover, all values that fall within these ranges, as well as the upper or lower limits of a range of values, are also contemplated by the present application.

The following examples further illustrate aspects of the present disclosure. However, they are in no way a limitation of the teachings or disclosure of the present disclosure as set forth herein.

Examples

Various embodiments of the present application can be better understood by reference to the following Examples which are offered by way of illustration. The scope of the present application is not limited to the Examples given herein.

Materials

Phenol (99.5%), 4-dimethylaminopyridine (DMAP, 99%), and chloroform-$d_3$ for NMR were purchased from Acros Organics. Methacrylic anhydride (94%) was purchased from Alfa Aesar. AMC-2 catalyst (a chromium (III)-based catalyst) was purchased from AMPAC Fine Chemicals. Diphenyl(2,4,5-trimethylbenzoyl) phosphine oxide (TPO) was purchased from TCI. Isopropyl alcohol (IPA) was purchased from VWR. Compressed nitrogen ($N_2$, 99.998%) and compressed argon (Ar, 99.999%) were purchased from Airgas. EPON™ Resin 828 (Diglycidyl Ether of Bisphenol A-, DGEBA) and EPIKURE™ W Curing Agent (Diethyl toluene diamine) were obtained from Hexion. NC-514 s was provided by Cardolite Corporation (Bristol, PA, USA). Isosorbide dimethacrylate (IM) was prepared as described in literature EPON 828 was transformed into bismethacryl glycidyl ether of bisphenol A and is denoted as vinyl ester 828 (VE828) using methods described in the in the literature with similar chemical and physical characterization results. All chemicals were used as received.

Resin Synthesis & Formulation

A. Vinyl and Epoxy Dual Functional Polymers Resins

Figure 2:
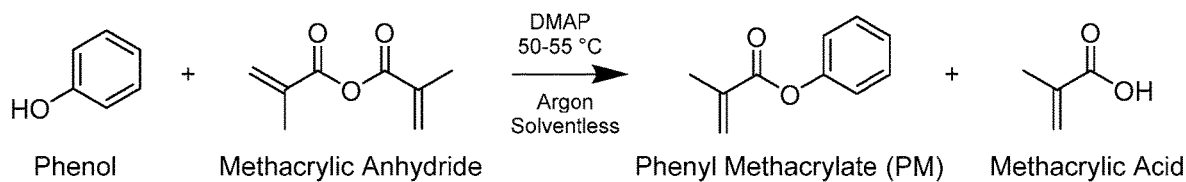
FIG. 2 shows a reaction scheme used to make a polymer having both vinyl and epoxy functional groups, in accordance with various embodiments.
Figure 2:
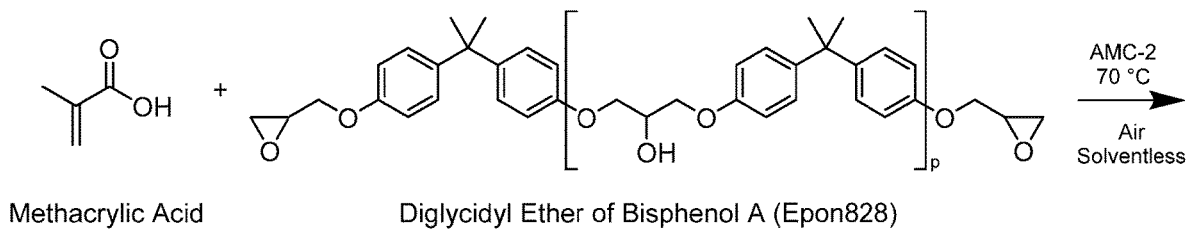
Figure 2:
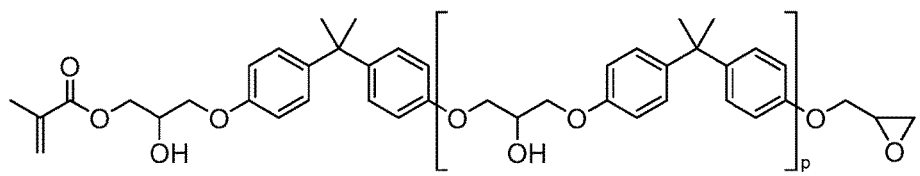

The resin was synthesized via a one-pot 2-step reaction methodology as show in FIG. 2. In a three-neck round bottom flask equipped with a mechanical mixer, phenol (200.00 g) and DMAP (13.11 g) were added. The mixture was purged with argon for 10 minutes and then methacrylic anhydride (330.91 g) was added. The reaction mixture was heated to 50-55° C. with continuous stirring. After 24 hours, the reaction mixture was cooled to room temperature and a stoichiometric amount of EPON™ 828 (804.75 g) was added along with AMC-2 catalyst (1.00 g) to perform the second step of the synthesis procedure whereby Epon828 is partially methacrylated. The mixture was then heated to 70° C. and monitored via acid number titration until completion (when the free acid number was <10, corresponding to ~3% acid). The final, synthesized PM-EM828 was comprised of mono-functional monomer, phenyl methacrylate (PM), and partially methacrylated bisphenol A epoxy (EM828), as a dual-functional crosslinker, in a 1:1 mole ratio. A fully methacrylated vinyl ester resin analogous to the PM-EM828 system was also prepared for comparative purposes, whereby Epon828 was added in a 0.5 mole ratio relative to methacrylic acid to facilitate the complete conversion of Epon828 to the corresponding difunctional vinyl ester, VE828.

Resins containing epoxy moieties were blended with stoichiometric amounts of Epikure W (i.e., 1 amine hydrogen per epoxide) to facilitate the cure of the epoxy-amine network. Furthermore, resin formulations were prepared by mixing all components in a Thinky Centrifugal Mixer in specific molar compositions as shown in Table 1. The PM-VE828 resin alone was utilized as a basis of comparison for this work.

TABLE 1

Resin compositions

| Sample | Formulation Composition | | | |
|---|---|---|---|---|
| | PM (mol) | VE828 (mol) | EM828 (mol) | Epon828 (mol) |
| PM-VE828 | 1 | 0.5 | 0 | 0 |
| PM-EM828 | 1 | 0 | 1 | 0 |
| PM-VE828 - Epon828 Blend | 1 | 0.5 | 0 | 0.5 |
| PM-EM828_025VE828 | 1 | 0.25 | 1 | 0 |
| PM-EM828_05Epon828_025VE828 | 1 | 0.25 | 1 | 0.5 |

The effect of network connectivity was evaluated by comparing the PM-EM828 to the PM-VE828-Epon828 Blend, due to the fact that these two systems have the exact same molar concentration of reactive epoxy and methacrylate groups; however, the PM-EM828 system allows the vinyl ester and the epoxy-amine network to be chemically connected to one another due to the EM828 monomer bearing both functionalities on the same molecule, whereas the PM-VE828-Epon828 blend does enable such molecular level connections.

Figure 3:
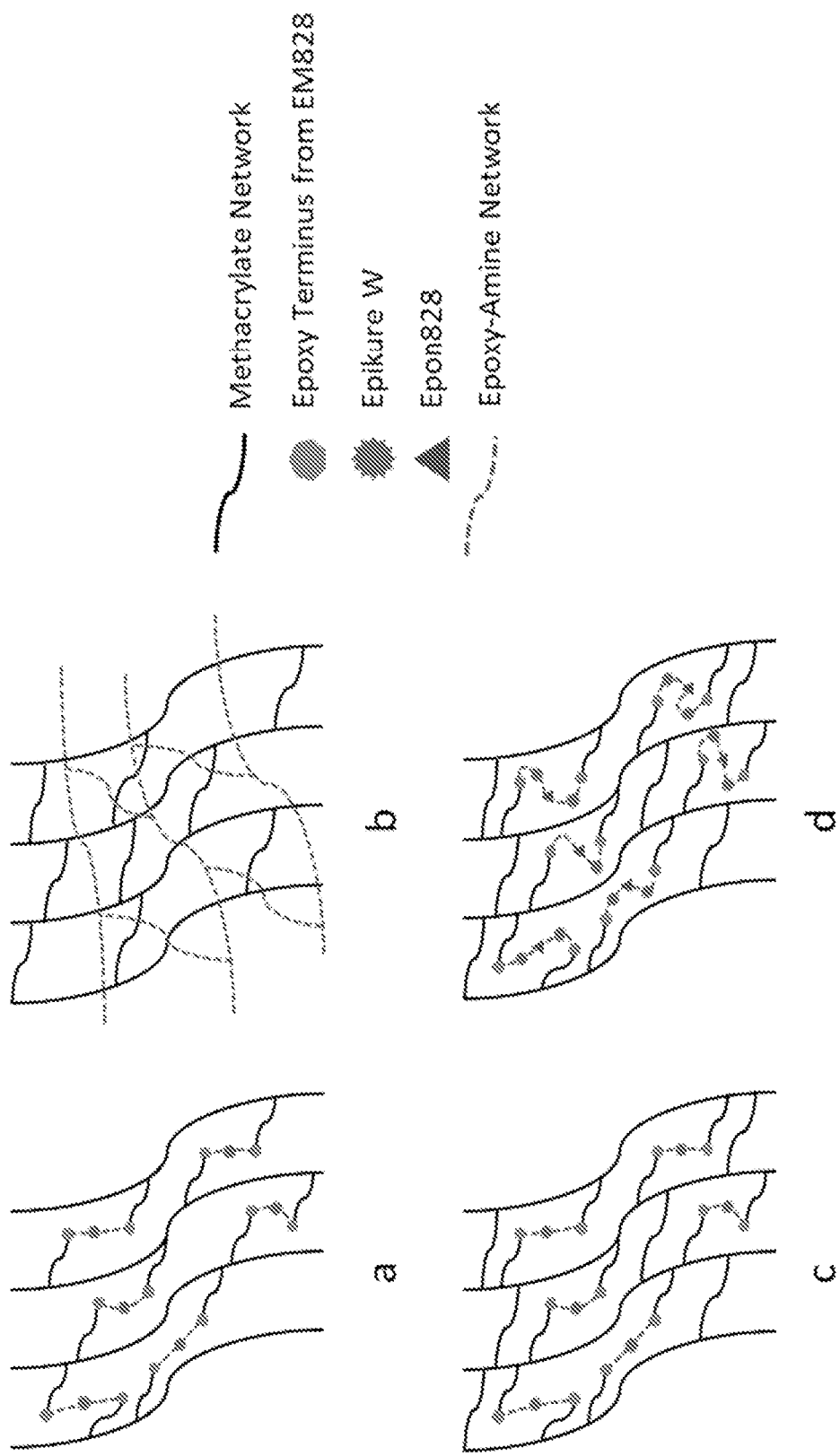
FIG. 3 shows a visual representations of a) the PM-EM828 network, b) the PM-VE828_Epon828 blend network, c) the PM-EM828_025VE828 network, and d) the PM-EM828_05Epon828_025VE828 network.

Furthermore, the PM-EM828 was blended with either VE828 or VE828 and Epon828 in the molar quantities described in Table 1 to evaluate the effect of molecular distance between the connections of the vinyl ester and epoxy-amine network on overall polymer properties. A visual representation of the networks formed is provided in FIG. 3.

B. Bio-Based Monomers, Polymers, and Resins

The resin was synthesized by adapting the one-pot reaction methodology described in our previous work. In a three-neck round bottom flask equipped with a mechanical mixer, phenol (50.00 g) and DMAP (3.28 g) were added. The mixture was purged with argon for 10 minutes and then methacrylic anhydride (82.73 g) was added. The reaction mixture was heated to 50-55° C. with continuous stirring. After 24 hours, the reaction mixture was cooled to room temperature and NC-514 s (224.47 g) was added along with AMC-2 catalyst (0.27 g). The mixture was then heated to 70° C. and monitored via acid number titration until completion (when the free acid number was <10, corresponding to ~3% acid). The synthesized resin (PM-NC514sVE) was comprised of mono-functional monomer, phenyl methacrylate (PM), and crosslinker, NC514sVE in a 1:0.5 mole ratio. The complete reaction scheme is shown in FIG. 10. The PM-NC514sVE resin was utilized as a standalone resin and also blended with both 10 wt % and 20 wt % IM to determine the effect of increasing IM content on resin properties.

Resin Characterization

The synthesized resins were characterized by $^1$H-NMR (400.15 MHz, 32 scans at 298 K) using a Varian 400 MHz FT-NMR spectrometer. The viscosity of the resins and formulations were obtained using a TA Instruments Discovery Hybrid Rheometer (DHR-2) using a 1° 40 mm cone geometry at a temperature of 25° C. The shear rate was ramped logarithmically ascending from 1 to 100 s$^{-1}$ and descending from 100 to 1 s$^{-1}$.

Resin Additive Manufacturing

All resins, polymers, and monomers were prepared for free radical photopolymerization via VPP by adding TPO as the photoinitiator at an amount of 2 wt % of the total, formulated resin mass. The resins, along with TPO, were mixed in a planetary mixer for 15 minutes and defoamed for 2 minutes. Digital models were prepared for viscoelastic, tensile, and fracture testing. The final models were uploaded to a SLA 3D printer. A layer thicknesses of 100 m was selected. After printing, the printed samples were washed with isopropyl alcohol for 20 minutes to remove any unreacted resin from the surface of the printed samples. These samples were denoted as AM samples. Additionally, the samples were further post-processed (FC) with UV/visible light ($\lambda$=405 nm) and heat (80° C.) for 2 hrs and then further post-cured at 180° C. for 2 hours in a thermal oven (denoted as PC).

Polymer Properties

Thermogravimetric analysis was performed using a thermogravimetric analyzer 550. 10 mg of sample was placed on a platinum pan and heated to 700° C. at a rate of 10° C. min$^{-1}$ in both N$_2$ (inert) and air (oxidative) atmospheres (40 mL min$^{-1}$ balance gas flow rate and 25 mL min$^{-1}$ sample gas flow rate). Initial decomposition temperature (IDT), temperature at 50 wt % degradation (T$_{50}$%), temperature at maximum degradation (T$_{max}$), and char content are reported.

A dynamic mechanical analyzer (DMA) was used to evaluate the viscoelastic properties of all cured resins. A single cantilever geometry with a frequency of 1.0 Hz, Poisson ratio of 0.35, and a deflection amplitude of oscillation of 7.5 m were used. The heating ramp was 2° C. per minute from 0° C. to 250° C.

Rheology

A. Vinyl and Epoxy Dual Functional Monomers, Polymers, and Resins

All resin compositions exhibited Newtonian behavior. The viscosity of each resin was determined via the average of three steady state points at different shear rates and is shown in Table 2.

TABLE 2

Viscosity of resins at 25° C.

| Sample | Viscosity at 25° C. (cP) | Viscosity at 25° C. with Epikure W (cP) |
|---|---|---|
| PM-VE828 | 578 ± 11 | — |
| PM-EM828 | 1172 ± 34 | 1226 ± 15 |
| PM-VE828 - Epon828 Blend | 1734 ± 63 | 1783 ± 20 |
| PM-EM828_025VE828 | 2774 ± 18 | 2996 ± 15 |
| PM-EM828_05Epon828_025VE828 | 5003 ± 36 | 5014 ± 54 |

The viscosities of each resin system increased as the overall molar concentration of crosslinker, either EM828, Epon828, or VE828, increased. Interestingly, although the PM-EM828 and PM-VE828-Epon828 Blend resins contain the exact same molar quantities of PM, crosslinkers, and bisphenolic content with identical molar quantities of methacrylate and epoxy moieties, the PM-EM828 system exhibits a significantly reduced viscosity relative to the blended counterpart. This is due to the EM828 monomer alone having a viscosity of 1.1×10$^5$ cP, whereas the equimolar blend of VE828 (6×10$^7$ cP) and Epon828 (1.3×10$^4$ cP) has a viscosity of approximately 3×10$^7$ cP based on a logarithmic simple rule of mixtures. Therefore, the preparation of the multi-functional EM828 provides reduced resin viscosity for the same molar content of reactive functionalities, thus potentially increasing processability.

B. Bio-Based Monomers, Polymers, and Resins

Figure 11:
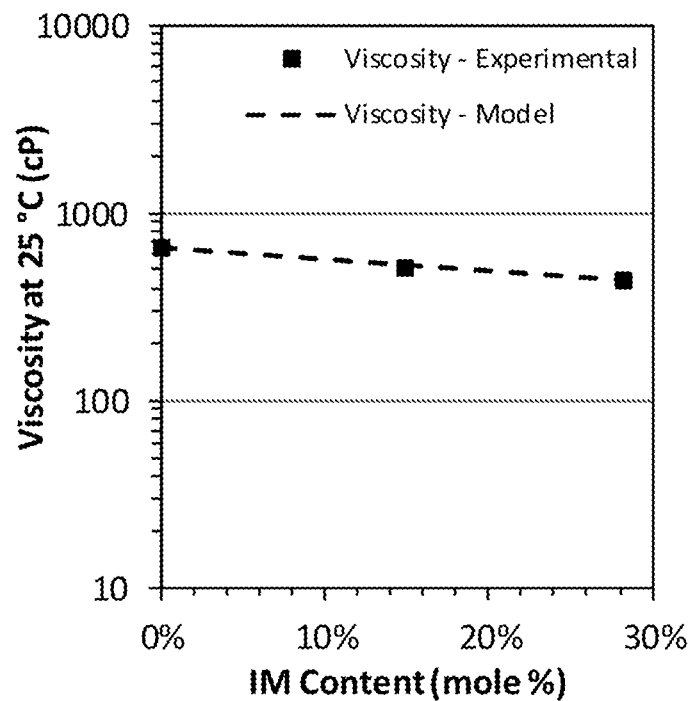
FIG. 11 shows the viscosity of the base PM-NC514sVE uncured resin system with varying IM content, in mole percent, at 25° C. Error associated with the obtained data is provided in Table 1A.

Uncured resin viscosities were obtained to determine the feasibility of the bio-based resins for VPP. The results are shown in FIG. 11 where IM wt % was converted to mol % to compare with predicted viscosities based on a logarithmic simple rule of mixtures, and Table 1A. The viscosity of each uncured resin formulation was determined using the average of three steady state points at varying shear rates. Based on the obtained rheological data, all resins exhibited Newtonian behavior. In order for a resin to be processed via VPP, viscosities under 3000 cP at room temperature are generally recommended. Therefore, as seen in Table 1A, the resin blends meet viscosity requirements for VPP. In various embodiments, the viscosity of the resin system decreased as the concentration of IM increased. Without being bound by theory, this is believed to be due to the IM, which has a viscosity on its own of approximately 157 cP at room temperature, acting as a reactive diluent. The viscosities experimentally obtained are expected based on a logarithmic simple rule of mixtures of the individual viscosities of the PM-NC514sVE (PM=3.1 cP and NC514 s=2.9×10$^7$ cP by themselves) and IM.

The working curve parameters, E$_c$ (the exposure per unit area required for the resin to reach its gel point) and Dr (the depth at which the irradiance is 13.5% of the irradiance at the interface where the laser contacts the resin), were estimated by OLS regression of cure depth as a function of the natural logarithm of E$_{max}$. All resin system parameter estimations are provided in Table 2A.

TABLE 1A

Viscosity of the Base PM-NC514sVE Uncured Resin System with Varying IM Weight Percentages

| Resin System | Viscosity at 25° C. (cP) |
|---|---|
| PM NC514sVE 0% IM | 651 ± 25 |
| PM NC514sVE 10% IM | 501 ± 15 |
| PM NC514sVE 20% IM | 436 ± 5 |

TABLE 2A

Working Curve Parameters, $D_P$ and $E_C$, for the PM NC514sVE Resin Systems with Varying IM Weight Percent

| Resin System | $D_p$ (mm) | $E_C$ (mJ cm$^{-2}$) |
|---|---|---|
| PM NC514sVE 0% IM | 0.30 ± 0.03 | 2.90 ± 0.45 |
| PM NC514sVE 10% IM | 0.28 ± 0.02 | 2.05 ± 0.20 |
| PM NC514sVE 20% IM | 0.27 ± 0.01 | 1.94 ± 0.10 |

Figure 12:
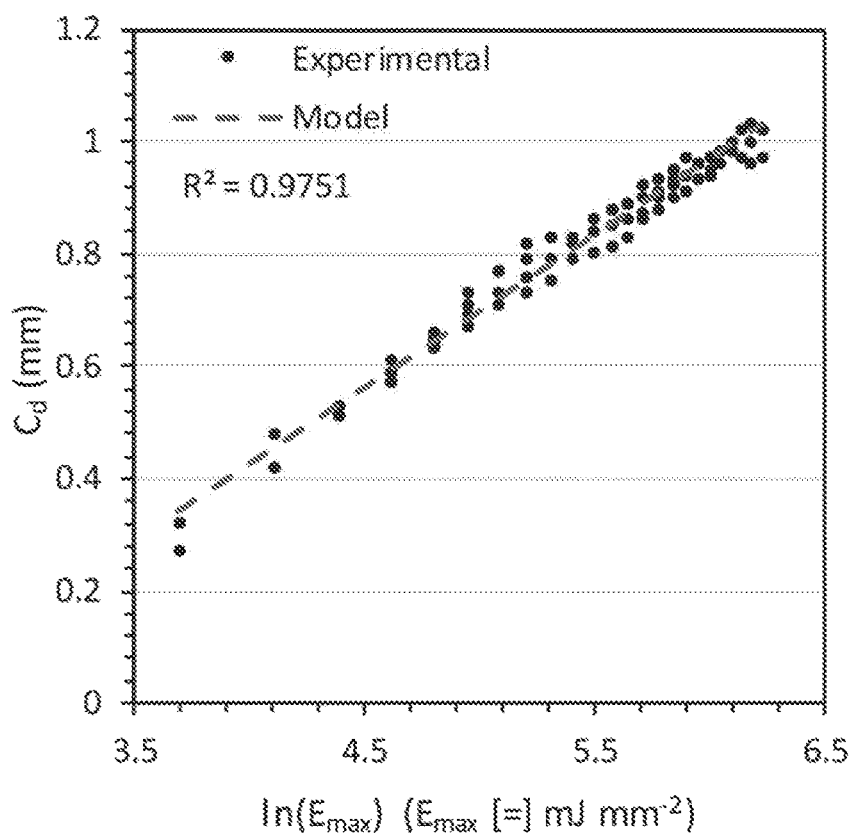
FIG. 12 shows the working curve for the PM-NC514sVE 20% IM resin system.

As seen in FIG. 12, the working curve model is in good agreement with the data. The resin blends show a general trend, whereby the increase in IM content yields a decrease in the working curve parameters. The addition of IM increases the overall methacrylate concentration in the resin formulations, ultimately reducing the overall sensitivity to light as observed by the lower $E_C$. Similarly, the increasing IM content yields a decrease in the $D_p$ as the higher methacrylate concentration yields, a higher crosslink density thermosetting polymer network, thus decreasing the penetration depth of light through the cured resin surface.

Extent of Cure

A. Vinyl and Epoxy Dual Functional Monomers, Polymers, Resins

Figure 4:
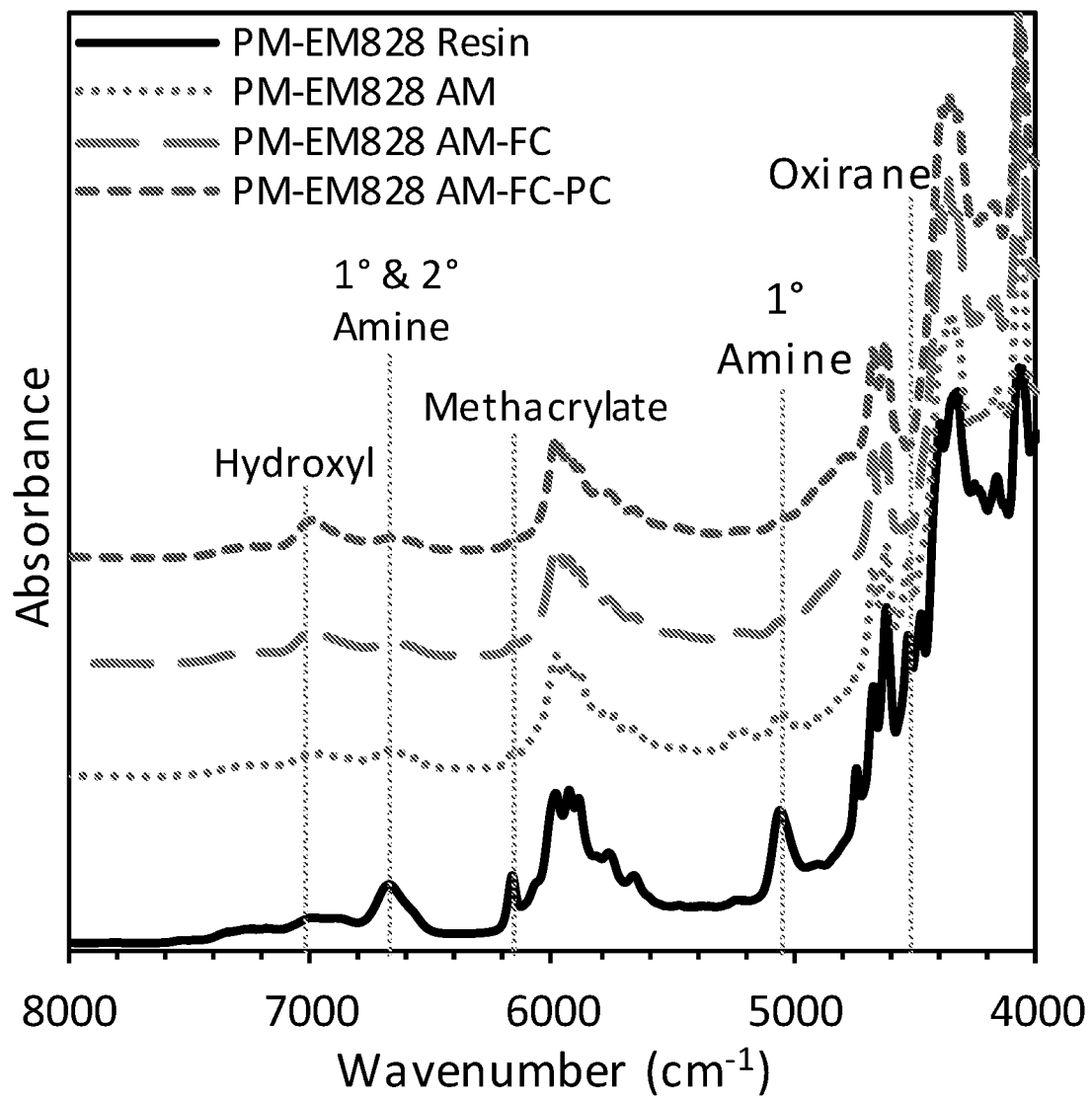
FIG. 4 shows near-IR spectra of PM-EM828 resin, and the resin at the AM, FC, and PC stages of cure, as defined herein. Spectra are vertically offset for clarity.

The extent of cure of the materials after print (AM), post-processed FC and post-cure (PC) were determined via near-infrared (near-IR) spectroscopy. The uncured resin was contained in a glass reservoir with a thickness of 3 mm. 64 cumulative scans with a resolution of 2 cm$^{-1}$ were collected. The cured resins had a thickness of 2.5 mm and their near-IR spectra were acquired in the same method as the uncured resins. The methacrylate peak was measured at ~6165 cm$^{-1}$ before and after curing and compared to a reference peak at 5900 cm$^{-1}$, which is not affected by the polymerization. When present, the oxirane ring of the epoxy was measured at ~4530 cm$^{-1}$ and the amine peaks were measure at ~5000 cm$^{-1}$ and ~6600 cm$^{-1}$. FIG. 4 shows representative near-IR spectra of the cured resins as well as the uncured resin.

TABLE 3

Extent of cure of resins via near-IR spectroscopy at various stages of cure, taken at room temperature.

| Sample | AM | AM-FC | AM-FC-PC |
|---|---|---|---|
| | Methacrylate Extent of Cure (%) | | |
| PM-VE828 | 75 ± 1 | 90 ± 1 | — |
| PM-EM828 | 85 ± 2 | 91 ± 1 | 93 ± 1 |
| PM-VE828 - Epon828 Blend | 84 ± 1 | 90 ± 3 | 90 ± 3 |
| PM-EM828_025VE828 | 82 ± 1 | 92 ± 2 | 92 ± 1 |
| PM-EM828_05Epon828_025VE828 | 87 ± 1 | 95 ± 1 | 95 ± 1 |
| | Epoxy-Amine Extent of Cure (%) | | |
| PM-VE828 | — | — | — |
| PM-EM828 | 0 | 83 ± 2 | 88 ± 2 |
| PM-VE828 - Epon828 Blend | 0 | 61 ± 8 | 72 ± 7 |
| PM-EM828_025VE828 | 0 | 65 ± 1 | 79 ± 1 |
| PM-EM828_05Epon828_025VE828 | 0 | 73 ± 1 | 83 ± 1 |

The only photopolymerizable groups within the resins are the methacrylate functionalities which have an absorbance in near-IR at 6165 cm$^{-1}$. The ratio between the methacrylate peak before and after cure steps were compared to an unreactive control peak at 5900 cm$^{-1}$ to calculate the extent of cure of the methacrylate network. Similarly, the oxirane ring on the epoxy and the amines have absorbances in near-IR at ~4530 cm$^{-1}$, ~5000 cm$^{-1}$, and ~6600 cm$^{-1}$ which were utilized to determine the extent of cure of the epoxy-amine network. After printing, the extent of cure of the methacrylate functionality for all resins were between 75-90% and all epoxy conversions were 0%, as the epoxy-amine reaction is not initiated during VPP printing; thus, the epoxy and amine monomers are plasticized within the shell of the methacrylate-based network.

The addition of the FC post-processing at 80° C. with irradiation of UV/visible light around the printed part further increases the extent of cure of the methacrylates to approximately 90%. Additionally, the FC stage at 80° C. initiates the epoxy-amine cure as this temperature is within the range of typical epoxy-amine cures. The overall epoxy extent of cure is shown to increase to between 65-83% for all samples, demonstrating that the approach of using staged cure via VPP with a thermal post-cure enables in-situ IPN formation whereby the epoxy-amine monomers are initially plasticized within the VPP-printed, methacrylate-based polymer matrix and sequentially initiated during FC. A traditional post-cure was further employed at 180° C. to further the conversion of the epoxy-amine network.

This post-cure was not employed for the fully methacrylate-based PM-VE828 due to the absence of epoxy-amine reactivity. Interestingly, the PM-EM828 and PM-VE828-Epon828 Blend, which contain the exact same molar quantities of PM, crosslinkers, and bisphenolic content with identical molar quantities of methacrylate and epoxy moieties have similar methacrylate extents of cure, but a difference in extent of cure of the epoxy-amine network of approximately 16%. Since the two networks are not connected in the PM-VE828-Epon828 Blend, the fully methacrylated portion likely results in the polymer after AM having a higher $T_g$ than all other IPNs prepared, thus causing vitrification of the network to happen quicker, resulting in the lower extent of cure of the epoxy-amine network in this sample. The PM-EM828_025VE828 and PM-EM828_05Epon828_025VE828 display similar values of extent of cure for both components, in between that of the PM-EM828 and PM-VE828-Epon828 Blend, as a result of additional formulation of methacrylate and epoxy functionalities which likely affect the $T_g$ of the polymer after AM, resulting in changes in vitrification.

B. Bio-Based Monomers, Polymers, and Resins

Figure 13:
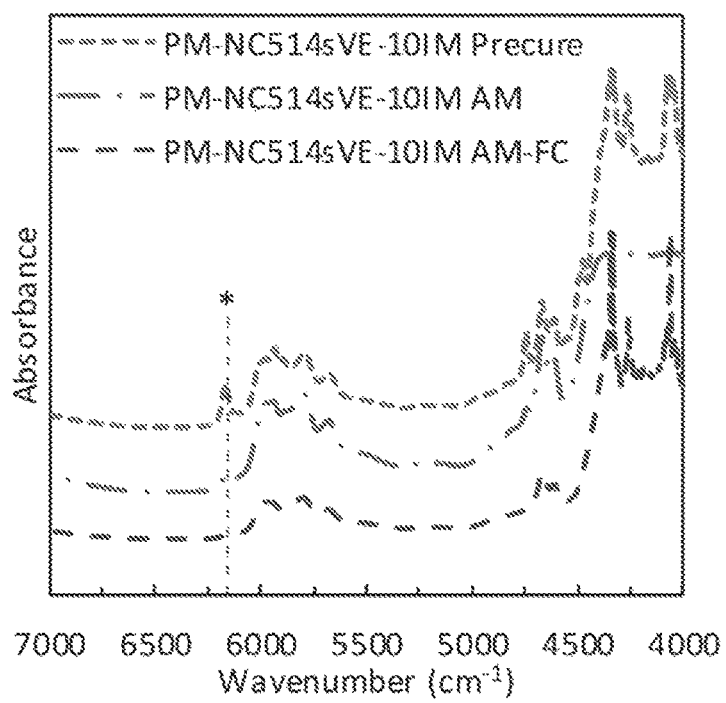
FIG. 13 shows near-IR spectra for the formulated resins immediately after print and wash (denoted as AM) and subsequently after post-processing.

Near-IR spectroscopy was used to determine the extent of cure for the formulated resins immediately after print and wash (denoted as AM) and subsequently after post-processing. Representative near-IR spectra are provided in FIG. 13 with the obtained extent of cure values listed in Table 3A.

TABLE 3A

Extents of Cure for before and after FC of Printed Samples for the PM-NC514sVE Resin Systems with Varying IM Weight Percentages

| Resin System | Extent of Cure AM (%) | Extent of Cure AMFC (%) |
|---|---|---|
| PM NC514sVE 0% IM | 81.1 ± 0.5 | 96.5 ± 0.4 |
| PM NC514sVE 10% IM | 80.2 ± 3.6 | 96.6 ± 0.9 |
| PM NC514sVE 20% IM | 81.9 ± 3.6 | 95.8 ± 0.3 |

The polymerizable methacrylate groups have an absorbance at 6165 cm$^{-1}$. The ratio between the methacrylate peak before and after the cure stages were compared to a reference peak (5900 cm$^{-1}$) to calculate the extents of cure. In general, all resin formulations exhibited similar extents of cure both after printing and washing and after post-processing. The addition of the FC (post-processing) acting as a traditional post cure while also irradiating the material with UV light, increased the overall extents of cure by approximately 16%, approaching near complete conversion, thus eliminating with high confidence the effect of curing extents on the polymer properties presented and discussed herein.

Polymer Properties

A. Vinyl and Epoxy Dual Functional Monomers, Polymers, Resins

Figure 5:
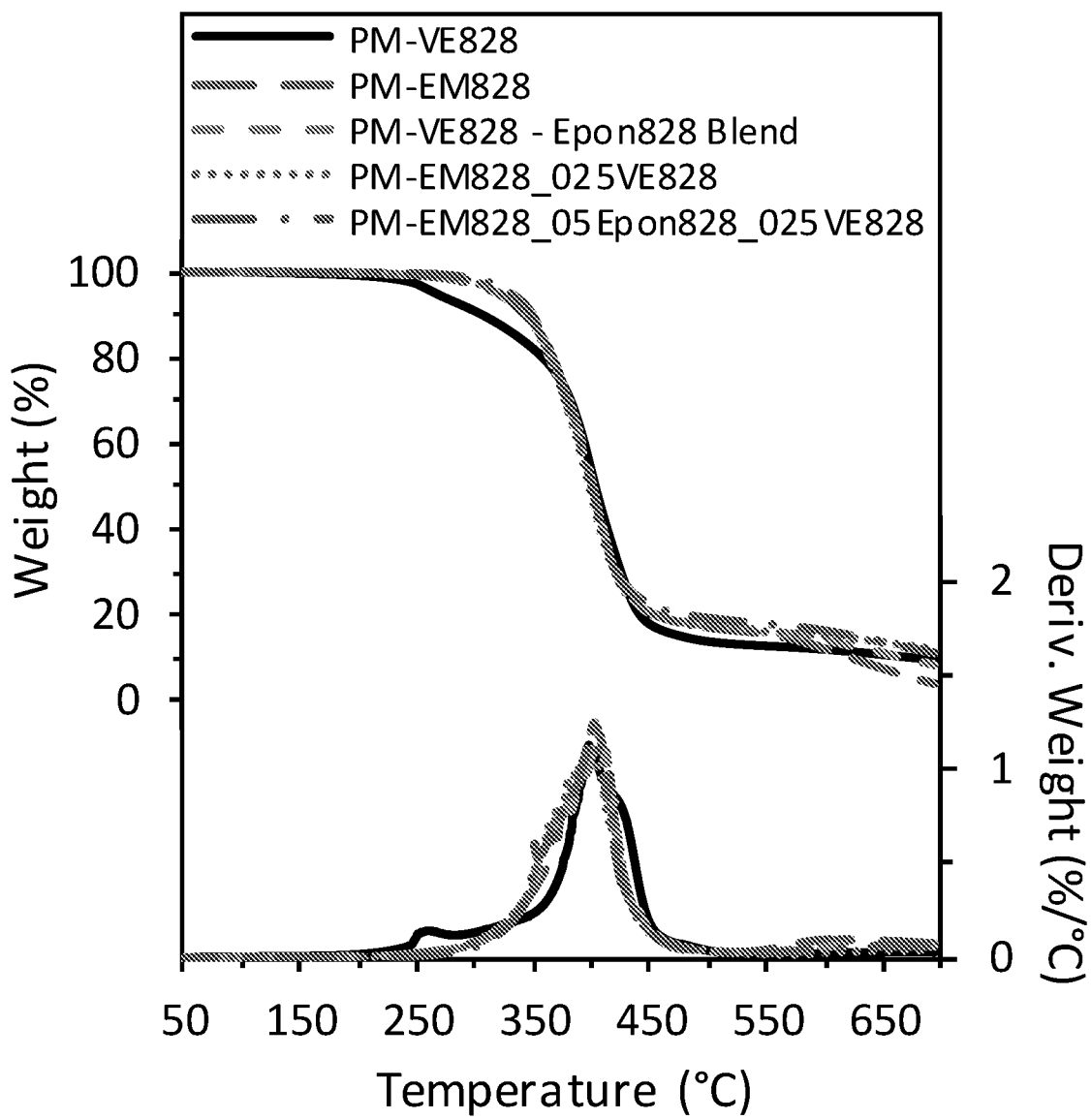
FIG. 5 shows TGA thermograms and the respective 1$^{st}$ derivatives of all IPNs characterized herein in $N_2$.

The resulting polymers were hard, glassy, dull green/brown samples. Thermal degradation of all cured resins was analyzed. The TGA thermograms are provided in FIG. 5. The IDT, $T_{50\%}$, $T_{max}$, and char content values are reported in Table 4.

TABLE 4

Thermogravimetric properties of all IPNs in $N_2$.

| Sample | IDT (° C.) | $T_{50\%}$ (° C.) | $T_{max}$ (° C.) | Char Content (° C.) |
|---|---|---|---|---|
| PM-VE828 | 267 ± 1 | 402 ± 1 | 395 ± 1 | 9.6 ± 0.3 |
| PM-EM828 | 318 ± 3 | 400 ± 1 | 402 ± 1 | 5.7 ± 2.0 |
| PM-VE828 - Epon828 Blend | 320 ± 1 | 400 ± 1 | 408 ± 6 | 9.3 ± 1.3 |
| PM-EM828_025VE | 324 ± 3 | 396 ± 2 | 399 ± 3 | 12.1 ± 0.2 |
| PM-EM828_05Epon828_025VE828 | 330 ± 1 | 401 ± 2 | 400 ± 1 | 8.1 ± 4.2 |

In general, all IPNs exhibit comparable thermogravimetric properties, with IDT values of approximately 320° C., $T_{50\%}$ and $T_{max}$ values of approximately 400° C., and char contents ranging from 5-12%. The fully methacrylate-based PM-VE828 was the only sample that showed a reduction in IDT. The lower IDT of the methacrylate-based PM-VE828 could be a result of the absence of the secondary network, which is likely contributing to higher IDT values of the IPNs and preventing premature degradation of the bulk material. Similar thermogravimetric trends were observed in an oxidative environment, with the only difference being that char content is lower, due to combustion of the char at high temperatures.

Figure 6:
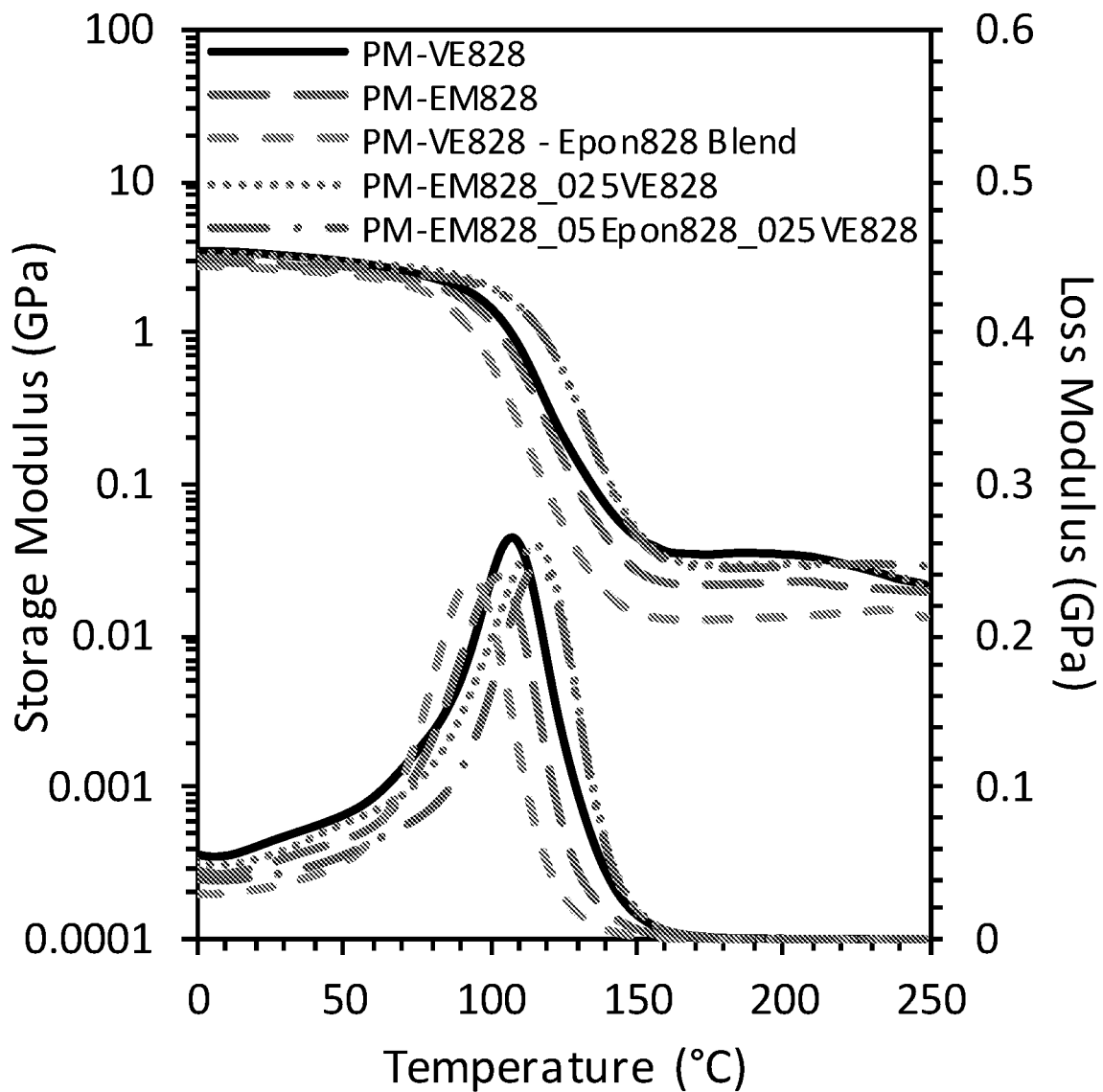
FIG. 6 shows DMA thermograms of E' and E" of all IPNs characterized herein.
Figure 7:
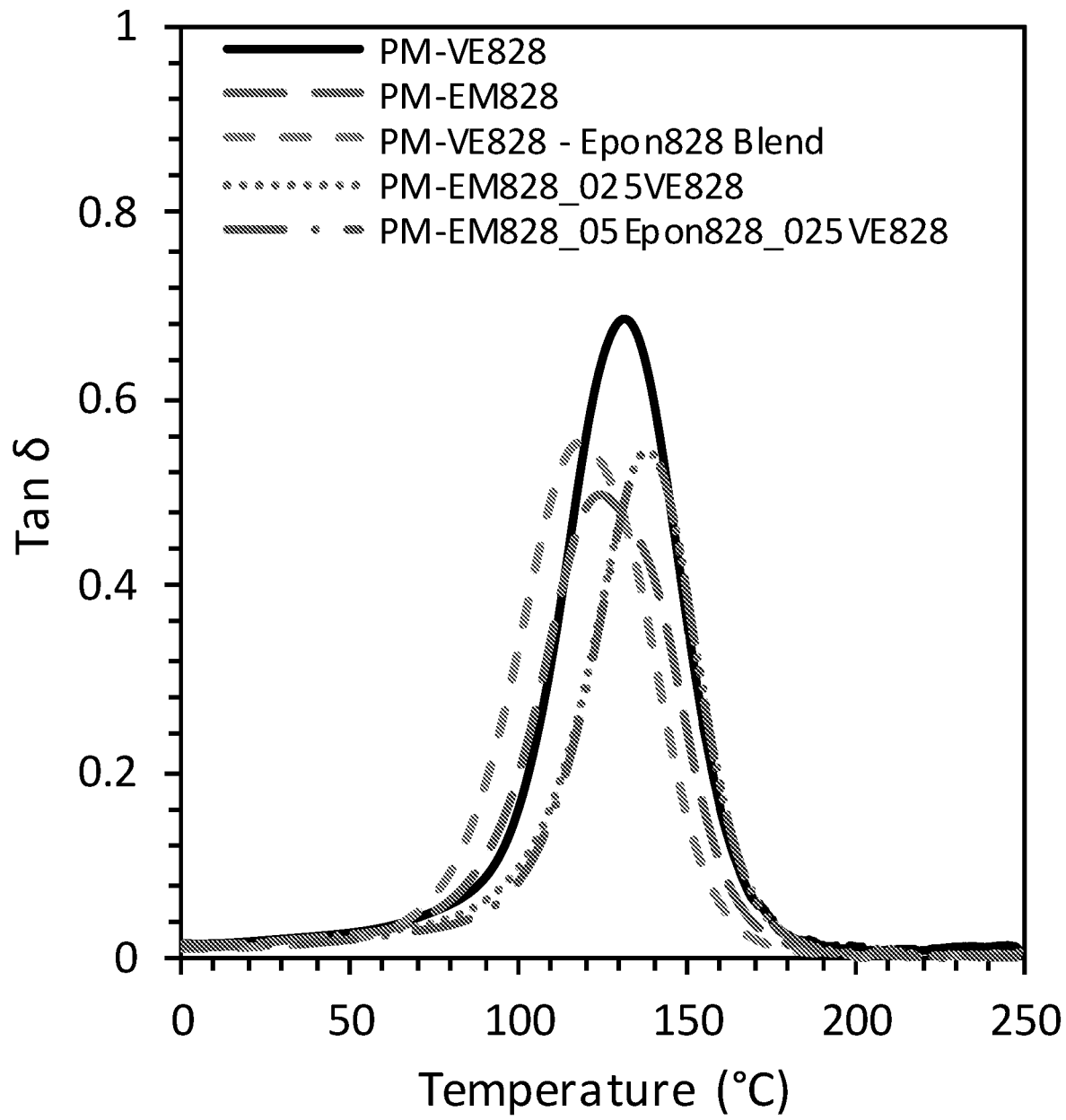
FIG. 7 shows tan δ thermograms of all IPNs characterized herein.

Viscoelastic properties of all IPNs were evaluated using DMA. FIG. 6 shows representative storage modulus (E') and the loss modulus (E") thermograms for all IPN samples. FIG. 7 shows the tan δ thermograms for each IPN. Table 5 shows the specific thermomechanical properties for all cured IPNs.

TABLE 5

Viscoelastic properties of all IPNs.

| Sample | E' @ 25° C. (GPa) | Peak of E" (° C.) | Peak of Tan δ (° C.) | Rubbery E' (MPa) | Rubbery T (° C.) | $M_c$ (g mol$^{-1}$) | ρ @ 25° C. (g cm$^{-3}$) |
|---|---|---|---|---|---|---|---|
| PM-VE828 | 3.1 ± 0.2 | 109 ± 1 | 134 ± 2 | 36.1 ± 1.9 | 176 ± 4 | 378 ± 20 | 1.216 ± 0.002 |
| PM-EM828 | 3.1 ± 0.2 | 103 ± 2 | 138 ± 2 | 26.4 ± 4.8 | 161 ± 9 | 511 ± 104 | 1.199 ± 0.003 |
| PM-VE828 - Epon828 Blend | 2.7 ± 0.2 | 92 ± 2 | 121 ± 6 | 15.1 ± 1.8 | 179 ± 5 | 906 ± 102 | 1.196 ± 0.002 |
| PM-EM828_025VE828 | 3.2 ± 0.1 | 114 ± 2 | 139 ± 2 | 28.9 ± 4.9 | 180 ± 5 | 469 ± 18 | 1.196 ± 0.003 |
| PM-EM828_05Epon828_025VE828 | 3.1 ± 0.1 | 117 ± 1 | 140 ± 2 | 28.6 ± 1.3 | 178 ± 3 | 468 ± 20 | 1.188 ± 0.002 |

The differences in E' at 25° C. were statistically insignificant for all samples, which exhibited comparable E' values to conventional styrene diluted vinyl esters at 25° C. and greater than that of typical epoxy-amine thermosets (~2.5 GPa) due to the methacrylate nature of these networks. The peak of E" and the peak of tan δ were both used to determine the $T_g$, the temperature at which the polymer goes from a glassy state to rubbery state. Comparing the PM-EM828 and PM-VE828-Epon828 Blend, which contain the exact same molar quantities of PM, crosslinkers, and bisphenolic content with identical molar quantities of methacrylate and epoxy moieties, demonstrates that the PM-EM828 yields a material with a $T_g$ approximately 10° C. higher than that of the PM-VE828-Epon828 Blend due to the higher extent of cure achieved. Furthermore, additional formulation of VE828 into the PM-EM828 resin further increases $T_g$ based on the peak of E" by approximately 11° C. due to the increase in crosslinker content in the overall system, yet the formulation of both VE828 and Epon828 (i.e., PM-EM828_05Epon828_025VE828) does not offer any additional increase in $T_g$. Therefore, the increase in molecular distance between the connection of the methacrylate and epoxy-amine network does not have a significant impact on $T_g$. Nevertheless, all of the prepared IPNs exhibit similar $T_g$ values to styrene diluted vinyl ester resins.

The width of the tan δ peak is associated with the heterogeneity of the polymer network. A broader peak indicates a more heterogeneous network and a wider distribution of relaxation modes. The tan δ thermograms of all IPNs show similar widths, indicating all IPNs exhibited similar levels of homogeneity. The maximum value of the tan δ can be used to provide insight in to the overall polymer chain segmental mobility, whereby a higher peak indicates a higher chain mobility. In general, the prepared IPNs exhibit slight differences in polymer chain segmental mobility, likely because of the differences in IPN composition and resulting values of $m_c$. The maximum value of the tan δ decreases with increasing values of $m_c$, with the exception of the PM-VE828-Epon828 Blend which is likely a result of the lower extent of cure of this system. Thus, the differences in interconnection of the two networks and the differences in molecular spacing have a minor effect on polymer chain segmental mobility.

$m_c$ was calculated using the Theory of Rubber Elasticity and is shown in Table 5. Comparing the fully methacrylate-based PM-VE828 to all other polymers prepared, it is observed that the PM-VE828 had the lowest M, of all prepared polymers. The PM-VE828-Epon828 Blend exhibited the highest M, of all samples, which is likely a result of the lower extent of cure of the epoxy-amine network.

All interconnected IPNs of PM-EM828, PM-EM828_025VE828, and PM-EM828_05Epon828_025VE828 display similar values of $M_c$. This result is due to all the crosslinkers (EM828, VE828, and Epon828) having similar molecular weights. The increase in molecular distance between the connection of the methacrylate and epoxy-amine network does not affect Me because, although the molecular weight between the two connected polymer networks is changing, the numerical $M_c$ exists independently from the IPN connection and accounts for the $M_c$ within each individual network, which in this case are all of similar magnitude.

Figure 8:
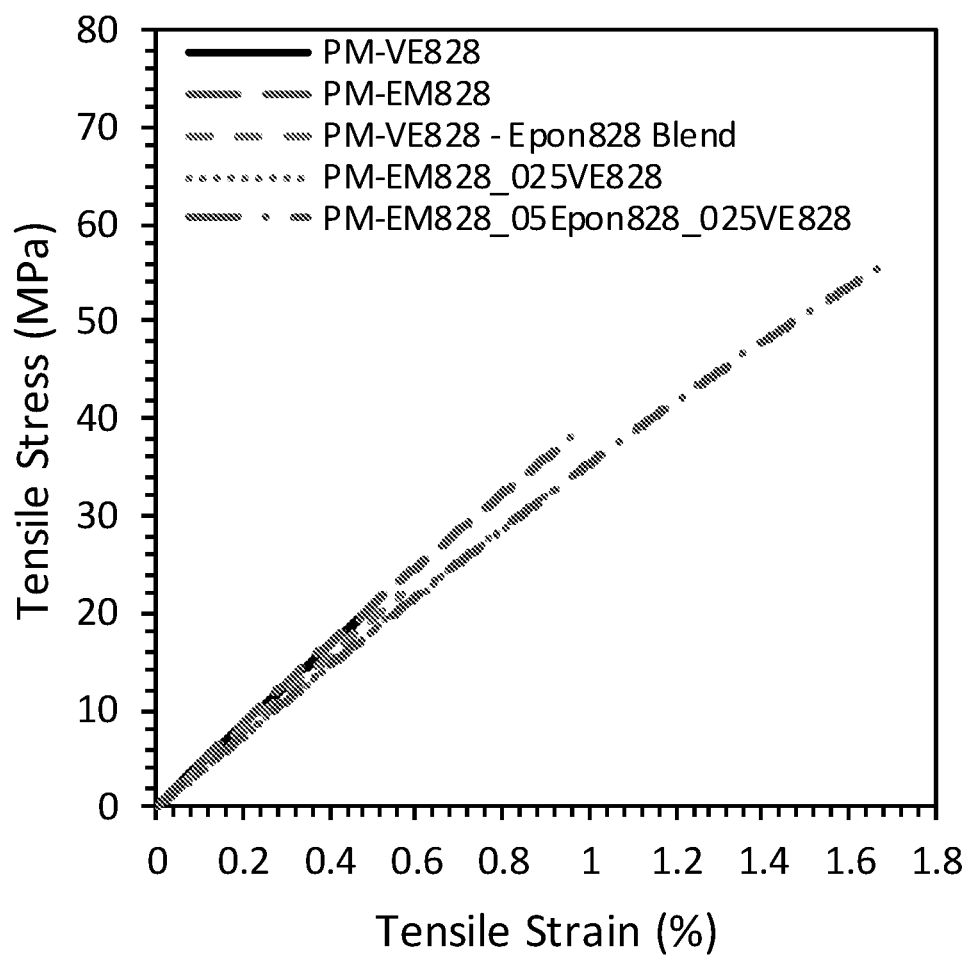
FIG. 8 shows stress/strain curves of all IPNs characterized herein.

Tensile testing was conducted to determine the effects of IPN connection on the resulting mechanical properties of the polymers. FIG. 8 shows the stress-strain curves for all samples. All samples showed linear behavior until break. Table 6 shows the data of the tensile properties for all cured polymers.

TABLE 6

Tensile testing values of all IPNs

| Sample | Energy at Max Force (J) | Young's Modulus (MPa) | Force at Break (N) | Tensile Strain at Break (%) | Tensile Stress at Break (MPa) |
|---|---|---|---|---|---|
| PM-VE828 | 0.04 ± 0.02 | 3947 ± 280 | 542 ± 2 | 0.45 ± 0.20 | 20.35 ± 1.83 |
| PM-EM828 | 0.11 ± 0.04 | 3807 ± 75 | 993 ± 133 | 0.91 ± 0.20 | 34.56 ± 4.64 |
| PM-VE828 - Epon828 Blend | 0.04 ± 0.01 | 3940 ± 58 | 566 ± 84 | 0.55 ± 0.06 | 20.86 ± 2.58 |
| PM-EM828_025VE828 | 0.08 ± 0.01 | 3957 ± 106 | 813 ± 57 | 0.81 ± 0.07 | 30.16 ± 2.29 |
| PM-EM828-05Epon828_025VE828 | 0.30 ± 0.05 | 3543 ± 86 | 1360 ± 132 | 1.54 ± 0.21 | 51.30 ± 5.20 |

Young's modulus, which is a measure of the stiffness of the polymer, has a direct correlation with the overall monomer structure, degree of crosslinking, as well as macromolecular architecture of the polymer network. The differences in Young's modulus were statistically insignificant for most samples, with the exception of PM-EM828_05Epon828_025VE828, likely due to the increase in epoxy character and resulting increase in molecular distance between the two formed networks as a result of the additional formulation of VE828 and Epon828. The fully methacrylate-based PM-VE828 exhibited the lowest tensile strain and tensile stress at break, on average. The PM-VE828-Epon828 Blend IPN yielded near-identical results to that of the fully methacrylate-based PM-VE828.

Unexpectedly, the PM-EM828, interconnected IPN yielded a material with significantly improved tensile properties over the PM-VE828-Epon828 Blend, which contains the exact same molar quantities of resin constituents and reactive species, thus demonstrating that the interconnection of the vinyl ester and epoxy-amine network yielded significant tensile strength enhancements likely as a result of the higher extent of cure. Yet, the addition of VE828 into the PM-EM828 resin (PM-EM828_025VE828) resulted in an overall decrease in the resulting IPN tensile properties, which is a result of increasing the number of crosslinks within the methacrylate network, subsequently decreasing molecular distance between network-level connections.

However, the addition of Epon828 (PM-EM828_05Epon828_025VE828) offsets this, causing an increase in both epoxy character and the molecular distance between the two interconnected networks formed. While this increase in molecular distance causes as slight reduction in Young's modulus as stated earlier, the change in network connectivity affords significant improvements in all other tensile properties measured including energy at maximum force, force at break, tensile strain at break, and tensile stress at break, which indicate that interconnecting and increasing molecular distance within the IPN results in increased toughness.

Figure 9:
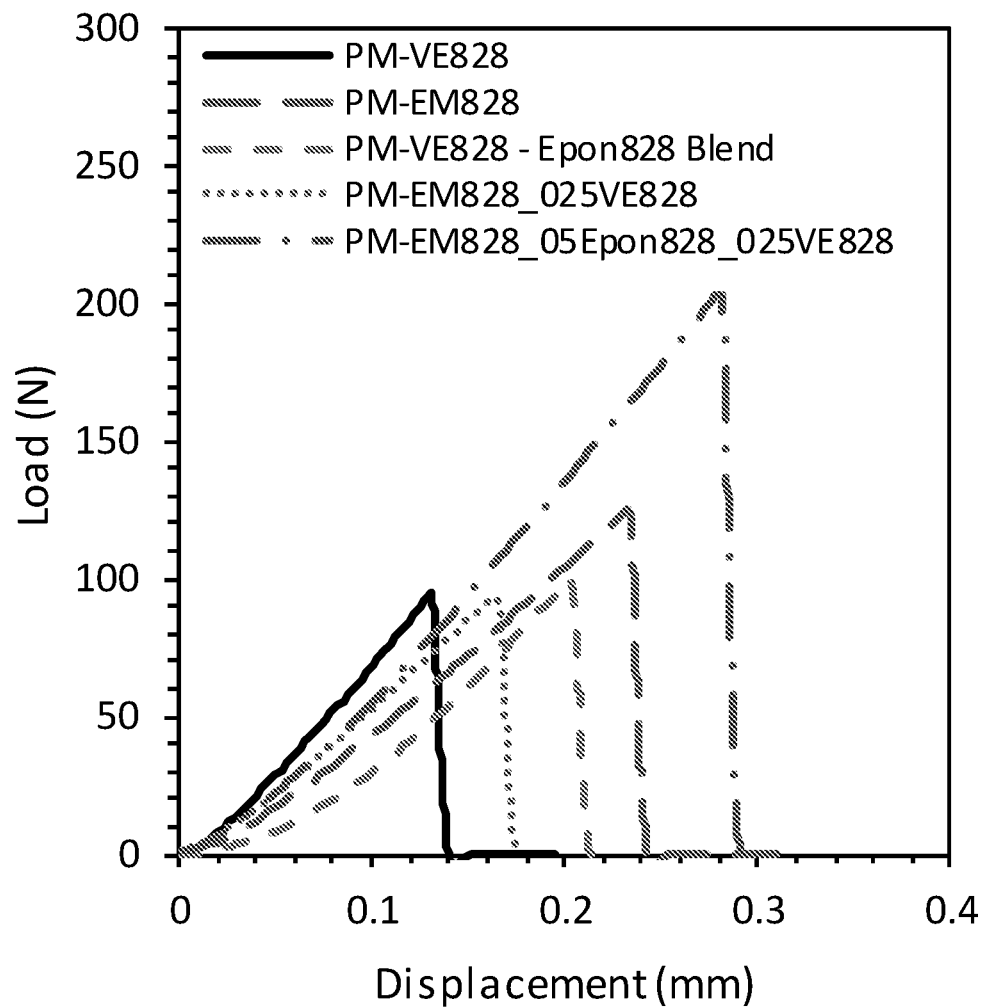
FIG. 9 shows load-displacement curves of all IPNs characterized herein.

The results obtained via tensile testing are further affirmed by the fracture toughness experiments. All samples displayed linear deformation to failure as shown in FIG. 9. The plane-strain fracture toughness, $K_{IC}$, and the critical strain energy release rate, $G_{IC}$, were obtained and are shown in Table 7.

TABLE 7

Fracture toughness $K_{1C}$ and $G_{1C}$ values of all IPNs

| Sample | $G_{1C}$ (J m$^{-2}$) | $K_{1C}$ (MPa m$^{1/2}$) |
|---|---|---|
| PM-VE828 | 222 ± 28 | 0.92 ± 0.03 |
| PM-EM828 | 668 ± 78 | 1.39 ± 0.13 |
| PM-VE828 - Epon828 Blend | 214 ± 26 | 0.86 ± 0.03 |
| PM-EM828_025VE828 | 283 ± 21 | 0.93 ± 0.05 |
| PM-EM828_05Epon828_025VE828 | 790 ± 71 | 1.55 ± 0.13 |

The fully methacrylate-based PM-VE828 system exhibited similar fracture toughness to that of styrene-diluted vinyl esters. The PM-VE828-Epon828 Blend displayed the lowest fracture toughness of all IPNs prepared. Interestingly, the PM-VE828-Epon828 Blend yields intermediate fracture properties based on the individual components of the network, whereby the PM-VE828 component is shown in Table 7 ($G_{IC}$ of 222 J m$^{-2}$) and the $G_{IC}$ of Epon828-EPIKURE™ W is shown in literature to be 135 J m$^{-2}$.

This intermediate fracture toughness is a result of the formation of the non-interconnected, meshed IPN and low extent of cure. However, the PM-EM828, interconnected IPN which contains the exact same molar quantities of PM, crosslinkers, and bisphenolic content and the same molar quantities of methacrylate and epoxy moieties to the PM-VE828-Epon828 Blend, yields significant gains in fracture toughness as a result of interconnecting the vinyl ester and epoxy amine network via the dual-functionality of the EM828 monomer, increasing $G_{IC}$ to 668 J m$^2$.

The addition of VE828 into the PM-EM828 resin resulted in a decrease in the $G_{IC}$ to 283 J m$^{-2}$ due to the increasing number of crosslinks within the methacrylate network and resulting decrease in molecular distance between network-level connections. However, the formulation of Epon828 offsets the decrease in toughness from the addition of VE828, whereby the PM-EM828_05Epon828_025VE828 system is shown to have a high fracture energy of 790 J m$^{-2}$, which is a result of the increase in total molecular distance between the two interconnected networks. The $G_{IC}$ of 790 J m$^{-2}$ for the additively manufactured PM-EM828_05Epon828_025VE828 IPN rivals that of thermally cured, rubber and/or particle toughened vinyl ester and epoxy resins. It is also important to note that this high fracture toughness is achieved without reduction in $T_g$, which is typical of rubber toughened systems due to the plasticizing effect of the particles.

B. Bio-Based Monomers, Polymers, and Resins

Figure 14:
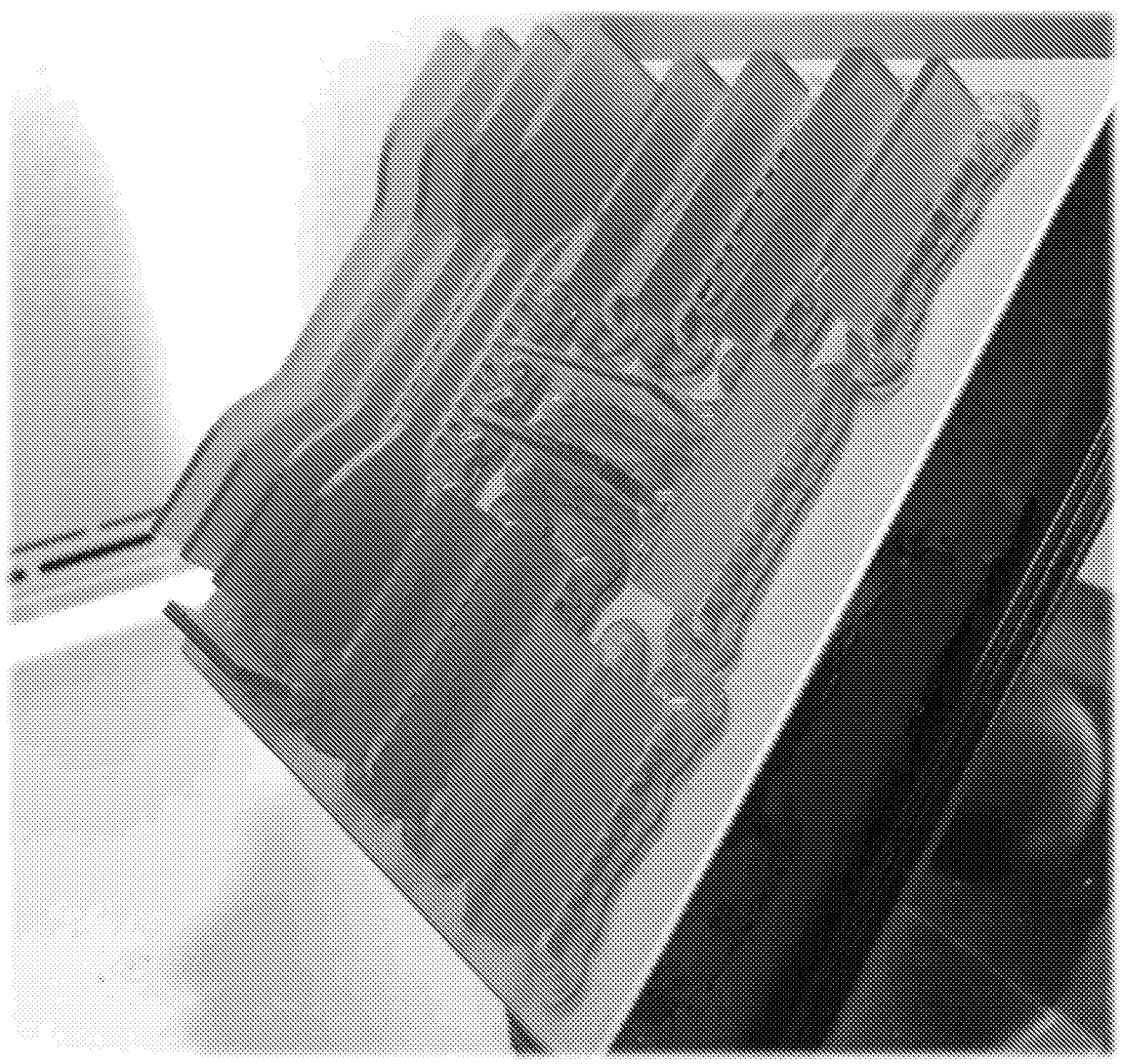
FIG. 14 is a photograph of VPP-printed polymers, according to various embodiments.

The resulting VPP-printed polymers were glassy at room temperature and brown in color, which is predominantly due to the color of the NC-514 s utilized in the resin synthesis. A representative photo of the samples is provided in FIG. 14.

Figure 15:
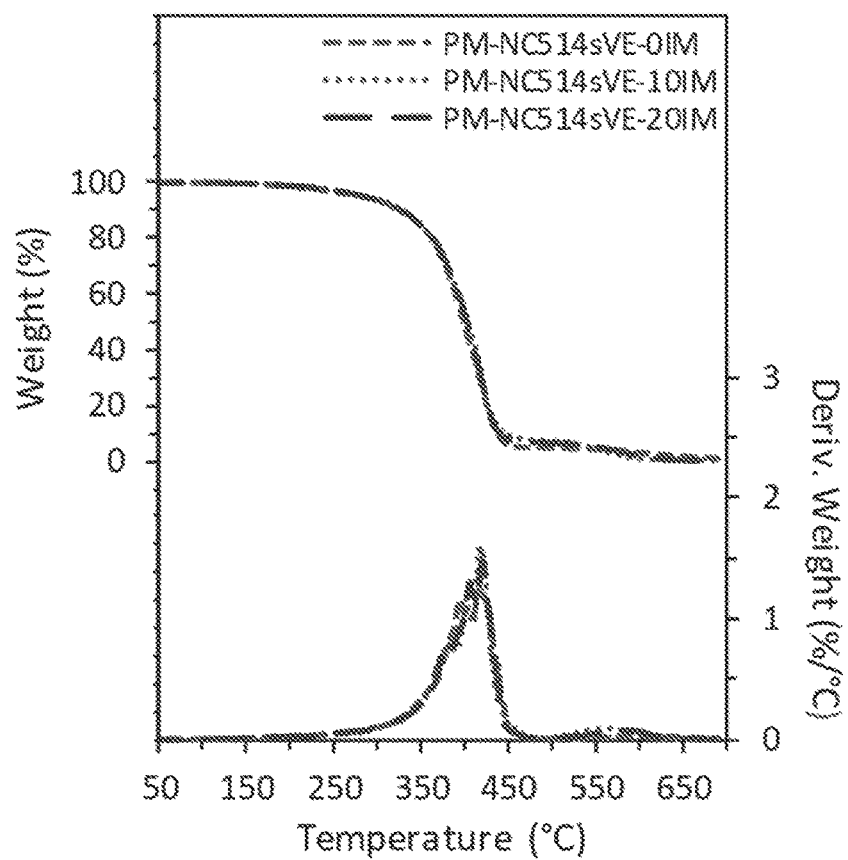
FIG. 15 shows TGA (thermogravimetric analysis) thermograms of post-processed samples containing PM NC514 s with varying IM weight percentages in $N_2$.

TGA was performed on all post-processed samples to determine their thermal stabilities. The thermograms in $N_2$ of the post-processed samples are shown in FIG. 15. The IDT, $T_{50\%}$, $T_{max}$, and char content values are provided in Table 4A.

TABLE 4A

Thermogravimetric Properties for the PM-NC514sVE Cured Resin System with Varying IM Weight Percentages in $N_2$

| Resin System | IDT (° C.) | $T_{50\%}$ | $T_{max}$ | Char Content (%) |
|---|---|---|---|---|
| PM NC514sVE 0% IM | 287 ± 5 | 399 ± 1 | 420 ± 1 | 1.9 ± 1.2 |
| PM NC514sVE 10% IM | 288 ± 1 | 403 ± 1 | 417 ± 1 | 0.3 ± 0.1 |
| PM NC514sVE 20% IM | 281 ± 6 | 402 ± 2 | 419 ± 3 | 0.3 ± 0.1 |

Figure 16:
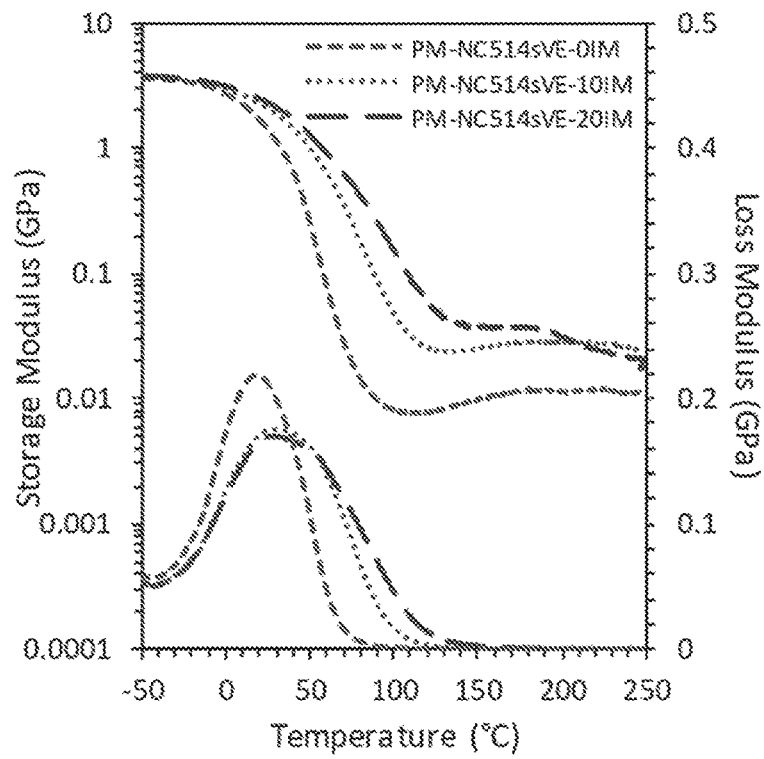
FIG. 16 shows representative DMA (dynamic mechanical analysis) E' and E" thermograms for each printed and fully processed (washed and post-processed) resin system containing PM-NC514sVE.

In general, all samples possess values for IDT, $T_{50\%}$, $T_{max}$, and char content which are within error of one another. Thus, IM addition into the base PM-NC514sVE resin does not have any significant impact on thermal stability. Viscoelastic properties were evaluated using DMA. Representative storage modulus (E') and loss modulus (E") thermograms for each sample are shown in FIG. 16, with the tan δ thermograms provided in FIG. 17. Table 5A includes the thermomechanical property values for each printed and fully processed (washed and post-processed) resin system.

The cured PM-NC514sVE resin system has the lowest E' of 3.5 GPa at −40° C. and 1.0 GPa at 25° C. due to the flexible character of CNSL-derived NC514sVE. IM addition increases the E' at −40° C. and at 25° C. as expected (see Table 5A), as cured IM alone has a E' of 4 GPa at 25° C. The peak of E" and the peak of tan δ were both used to estimate $T_g$, or the temperature at which the polymer goes from a rigid state to a more flexible and rubbery state upon heating, for the samples. Generally, the peak of E" gives a more conservative value for the $T_g$ while the peak of the tan δ provides an upper limit value. Due to concerns of peak overlap from the continual β-relaxation of the long, alkyl chain of NC514sVE, the peak of the tan δ was utilized as the value of $T_g$ for comparative purposes. Overall, the $T_g$s follow the same trend as the E's, whereby the base PM-NC514sVE cured resin system displayed a $T_g$ of 63° C. and the addition of 10 wt % and 20 wt % IM yielded cured resin systems with $T_g$s of 91° C. and 109° C., respectively.

TABLE 5A

Thermomechanical Results for PM-NC514sVE Samples with Varying IM Weight Percentages.

| Sample | E' @ −40° C. (GPa) | E' @ 25° C. (GPa) | Peak of E'' (° C.) | Peak of tan δ (° C.) | $M_c$ (g mol$^{-1}$) | ρ @ 25° C. (g cm$^{-3}$) |
|---|---|---|---|---|---|---|
| PM NC514sVE 0% IM | 3.5 ± 0.3 | 1.0 ± 0.3 | 11.5 ± 4.8 | 62.7 ± 1.3 | 3015 ± 357 | 1.123 ± 0.002 |
| PM NC514sVE 10% IM | 3.7 ± 0.2 | 2.0 ± 0.2 | 25.3 ± 2.2 | 90.8 ± 2.9 | 547 ± 77 | 1.146 ± 0.001 |
| PM NC514sVE 20% IM | 4.0 ± 0.2 | 2.2 ± 0.1 | 27.0 ± 3.5 | 108.6 ± 1.5 | 388 ± 47 | 1.158 ± 0.006 |

Figure 17:
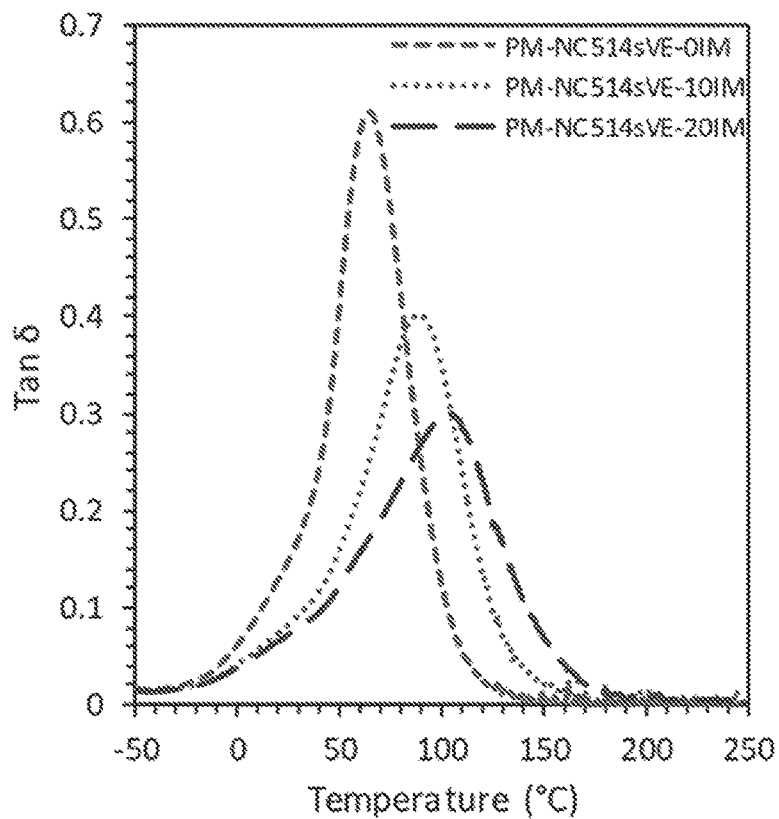
FIG. 17 shows representative tan δ thermograms for the PM-NC514sVE cured resin systems with varying IM weight percentages.

The width of the tan δ peak is associated with the heterogeneity of the thermosetting polymer network whereby a broader peak indicates a more heterogeneous network and a wider distribution of relaxation modes. With the incorporation of IM into the PM-NC514sVE resin system, the width of the tan δ peak increases due to increasing the heterogeneity of the formulation, as there are now three different components with vastly different molecular structures within the polymer matrix. The polymer chain segmental mobility is specified by the maximum value of the tan δ, whereby a higher peak indicates higher chain segmental mobility. As the IM content is increased in the resin formulations, the stiff nature of the IM structure restricts the chain mobility within the entirety of the thermosetting polymer network, thereby reducing the peak height of the tan δ as shown in FIG. 17.

Mc values, calculated using the Theory of Rubber Elasticity, are shown in Table 5A. In various embodiments, as IM concentration is increased the value of $M_c$ decreases. This is due to the low molecular weight of IM as well as IM acting as a crosslinking agent upon curing, which yields a polymer matrix with a higher degree of crosslink density (lower $M_c$ values). Likewise, the crosslink density increase and $M_c$ decrease directly correlate to the increase in bulk polymer density as the IM content is increased (see Table 5A).

Figure 18:
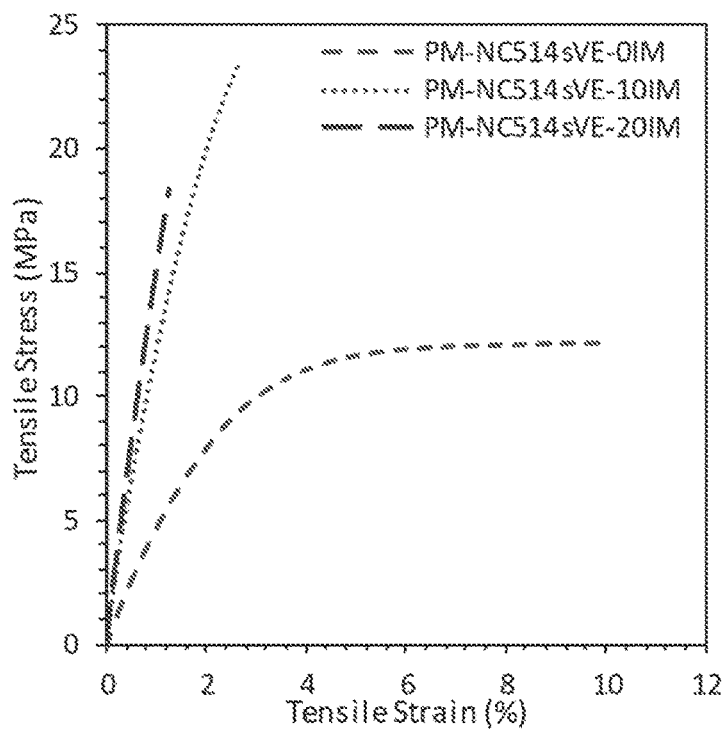
FIG. 18 shows stress-strain curves of the cured PM-NC514sVE resin systems with varying IM weight percentages.

Tensile testing was conducted to determine the effects of increasing IM content on the tensile properties of the VPP-printed thermoset polymers. FIG. 18 shows the representative stress-strain curves for the prepared polymers. Tensile test properties including energy at max force, Young's modulus, force at break, tensile strain, and tensile stress are reported in Table 6A.

TABLE 6A

Tensile testing results for the Cured PM-NC514sVE Resin Systems with Varying IM Weight Percentages

| Sample | Energy at Max Force (J) | Young's Modulus (MPa) | Force at Break (N) | Tensile Strain at Break (%) | Tensile Stress at Break (MPa) |
|---|---|---|---|---|---|
| PM NC514sVE 0% IM | 0.62 ± 0.09 | 543 ± 16 | 314 ± 9 | 9.44 ± 1.13 | 12.29 ± 0.50 |
| PM NC514sVE 10% IM | 0.32 ± 0.08 | 1285 ± 56 | 463 ± 43 | 3.11 ± 0.58 | 17.57 ± 1.74 |
| PM NC514sVE 20% IM | 0.09 ± 0.01 | 1787 ± 48 | 509 ± 31 | 1.27 ± 0.11 | 19.15 ± 1.23 |

The cured PM-NC514sVE resin system exhibited the lowest Young's modulus and highest tensile strain at break of 543 MPa and 9.44%, respectively. The low Young's modulus and high strain at break values are due to the chemical structure of the NC514sVE component, which is known to exhibit elastic behavior and yield low modulus materials. However, upon IM addition, the Young's modulus increases significantly, while the strain at break is significantly decreased. As seen in Tables 5A and 6A and in general, as $M_c$ is decreased, an increased Young's modulus is expected. As shown in the results, the cured resin systems follow this trend, whereby the addition of IM results in a decrease in $M_c$, thus directly correlating to the increase in Young's modulus and decrease in strain at break. However, while the addition of IM substantially increased the overall material strength, the addition of IM led to the embrittlement of the material as shown by the significant decrease in the energy at max force.

Figure 19:
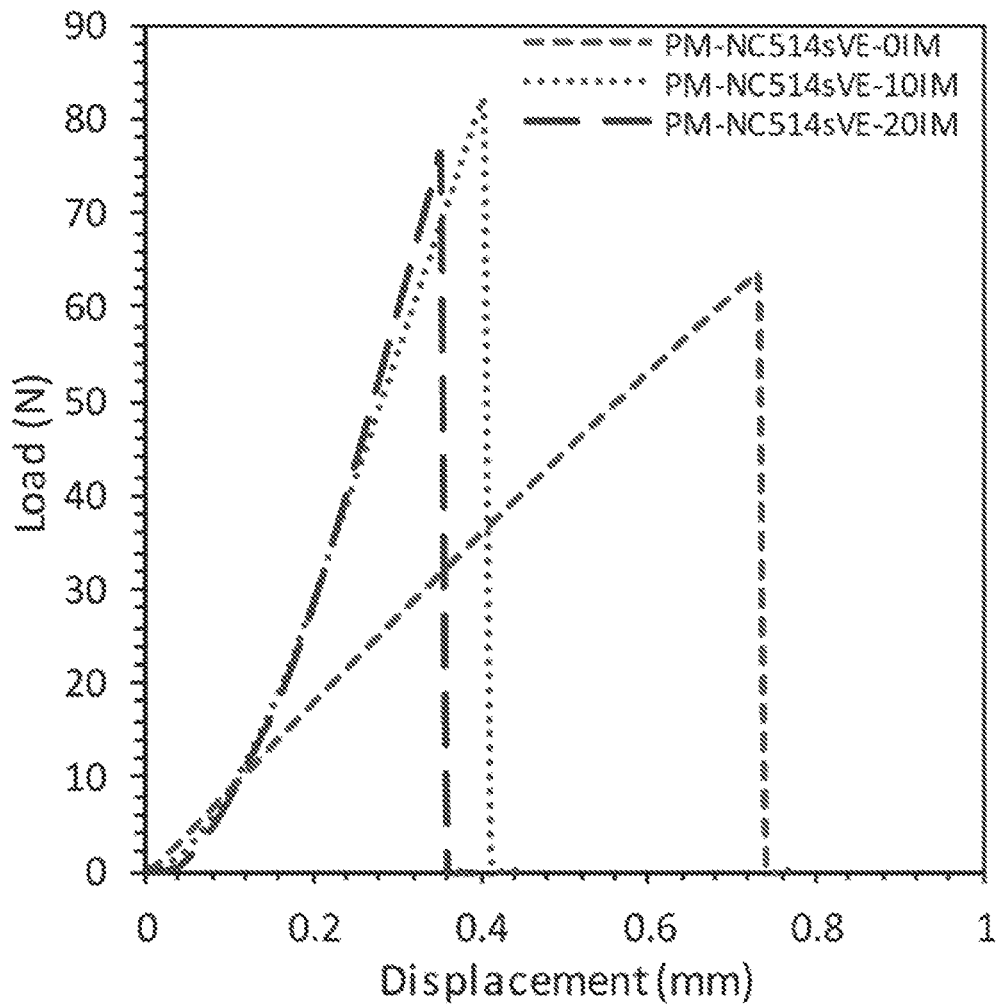
FIG. 19 shows load displacement curves for the prepared PM-NC514sVE polymers with varying IM weight percentages.

The tensile test results are also affirmed in the fracture toughness experiments. All samples displayed linear deformation to failure as shown in FIG. 19. The plane-strain fracture toughness, $K_{IC}$, and the critical strain energy release rate, $G_{IC}$, were obtained and are reported in Table 7A. In general, as the IM content increased, both the $K_{IC}$ and $G_{IC}$ decreased. The cured PM-NC514sVE resin system with no IM had $K_{IC}$ and $G_{IC}$ values of 0.55 MPa m$^{12}$ and 729 J m$^{-2}$, respectively, indicating that it was the toughest of the thermosetting polymers printed and tested. The most brittle cured resin system was the PM-NC514sVE 20% IM with a $K_{IC}$ of 0.50 MPa m$_{1/2}$ and $G_{IC}$ of 160 J m$^2$.

The decrease in toughness is due to the IM containing resins yielding thermoset matrices with higher crosslink densities (lower $M_c$ values), as indicated by the DMA results (see Table 5A), and, overall, decreased aliphatic content, which usually provides toughening.

The addition of IM into the cured polymer networks decreased flexibility as demonstrated through the increased Tgs and Young's moduli, and decreased toughness when comparing the performance of the three SLA-printed, bio-based resins.

TABLE 7A

Fracture toughness $K_{1C}$ and $G_{1C}$ values for PM-NC514sVE with Varying IM Weight Percentages

| Sample | $G_{1C}$ (J m$^{-2}$) | $K_{1C}$ (MPa m$^{1/2}$) |
|---|---|---|
| PM NC514sVE 0% IM | 0.55 ± 0.01 | 729 ± 36 |
| PM NC514sVE 10% IM | 0.57 ± 0.05 | 325 ± 51 |
| PM NC514sVE 20% IM | 0.50 ± 0.03 | 160 ± 64 |

Enumerated Embodiments

The following enumerated embodiments are provided, the numbering of which is not to be construed as designating levels of importance:

Embodiment 1 provides an interpenetrating polymer network (IPN) comprising the reaction product of:
 a crosslinker comprising at least one epoxy curing group; and
 a compound comprising at least one vinyl ester functionality and at least one epoxy functionality,
 wherein the at least one vinyl ester functionality is polymerized by photo-induced, free radical polymerization, and
 wherein the at least one epoxy functionality and the crosslinker are polymerized by thermal step-growth polymerization.

Embodiment 2 provides the IPN of embodiment 1, wherein the compound has the structure of Formula I or Formula I-A:

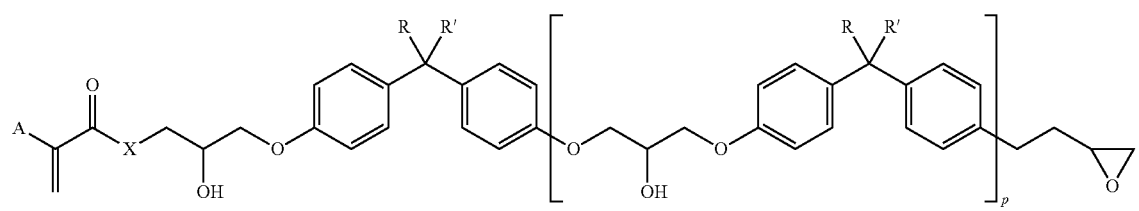

Formula I

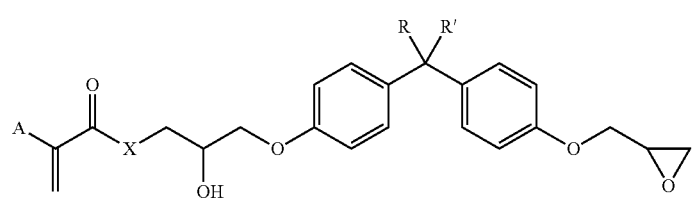

Formula I-A wherein:
A is selected from the group consisting of H, $C_{1-3}$ alkyl, CN, F, Cl, and perfluorinated $C_{1-3}$ alkyl;
X is O or N—R";
each occurrence of R is independently selected from the group consisting of H, $C_{1-3}$ alkyl, F, and perfluorinated $C_{1-3}$ alkyl;
each occurrence of R' is independently selected from the group consisting of H, $C_{1-3}$ alkyl, F, and perfluorinated $C_{1-3}$ alkyl;
each occurrence of R" is independently H or $C_{1-3}$ alkyl; and
p is an integer from 0 to 100,000.

Embodiment 3 provides the IPN of any one of embodiments 1-2, wherein R is $CH_3$.

Embodiment 4 provides the IPN of any one of embodiments 1-3, wherein R' is $CH_3$.

Embodiment 5 provides the IPN of any one of embodiments 1-4, wherein the compound of Formula I has the structure:

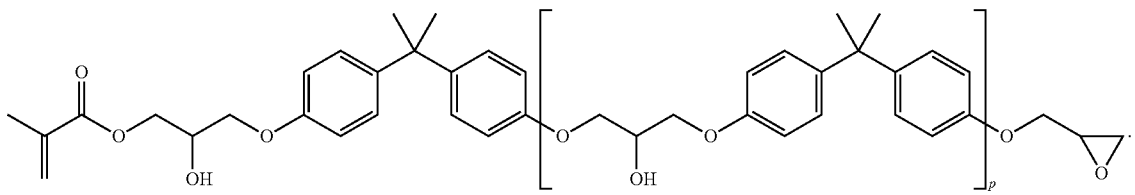

Embodiment 6 provides the IPN of any one of embodiments 1-5, wherein the compound has the structure of Formula III-A:

Formula III-A

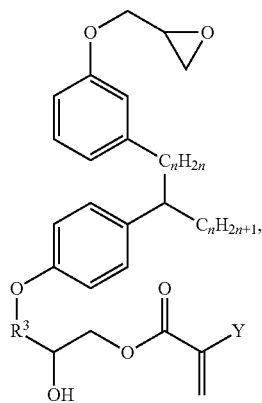

wherein:
each instance of $R^3$ is independently selected from the group consisting of optionally substituted $C_1$-$C_6$ alkyl, optionally substituted $C_2$-$C_6$ alkenyl, optionally $C_2$-$C_6$ alkynyl;
each instance of Y is independently selected from the group consisting of optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, and optionally $C_1$-$C_6$ haloalkyl; and
n is 5, 6, 7, 8, 9, 10, 11, 12, 13, 14, 15, 16, 17, 18, 19, or 20.

Embodiment 7 provides the IPN of any one of embodiments 1-6, wherein the vinyl ester functionality is photopolymerized using vat photopolymerization (VPP).

Embodiment 8 provides the IPN of any one of embodiments 1-7, wherein the vinyl ester functionality is photopolymerized using VPP.

Embodiment 9 provides the IPN of any one of embodiments 1-8, wherein the crosslinker is an epoxy curing agent.

Embodiment 10 provides the IPN of any one of embodiments 1-9, wherein the epoxy-crosslinker polymerization is promoted using thermal post-processing.

Embodiment 11 provides the IPN of any one of embodiments 1-10, further comprising

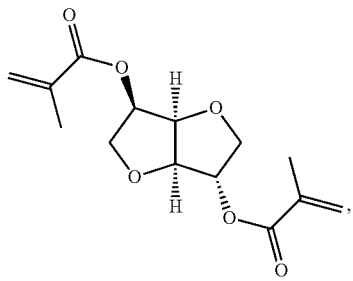 [SMILES: C=C(C)C(=O)O[C@H]1CO[C@H]2[C@@H]1OC[C@H]2OC(=O)C(=C)C]

or a crosslinked product thereof.

Embodiment 12 provides a method of preparing an interpenetrating polymer network (IPN), the method comprising:
applying VPP to a mixture of: a crosslinker comprising at least one amine functionality, and a monomer, oligomer, or polymer bearing at least one vinyl ester functionality and at least one epoxy functionality, under conditions whereby the vinyl ester functionality is photopolymerized; and exposing the resulting mixture to thermal conditions whereby epoxy-amine polymerization takes place.

Embodiment 13 provides the method of embodiment 12, wherein the monomer has the structure of Formula I-A:

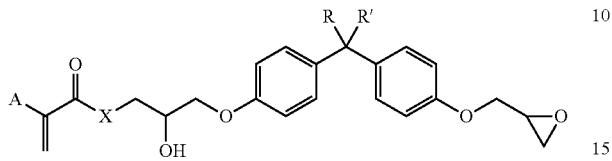

Formula I-A wherein:
A is selected from the group consisting of H, $C_{1-3}$ alkyl, CN, F, Cl, and perfluorinated $C_{1-3}$ alkyl;
X is O or N—R";
R is selected from the group consisting of H, $C_{1-3}$ alkyl, F, and perfluorinated $C_{1-3}$ alkyl;
R' is selected from the group consisting of H, $C_{1-3}$ alkyl, F, and perfluorinated $C_{1-3}$ alkyl;
R" is H or $C_{1-3}$ alkyl; and
p is an integer from 0 to 100,000.

Embodiment 14 provides the method of any one of embodiments 12-13, wherein the polymer has the structure of Formula I:

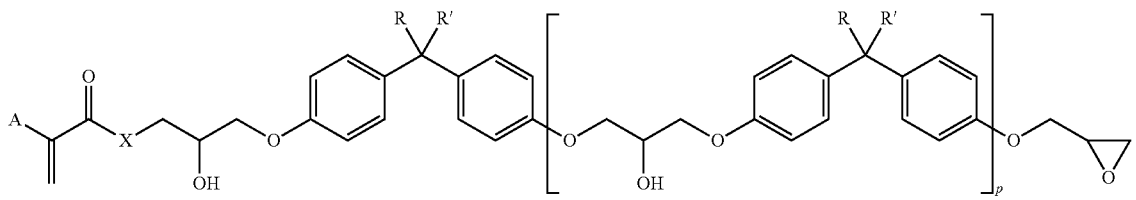

wherein:
A is selected from the group consisting of H, $C_{1-3}$ alkyl, CN, F, Cl, and perfluorinated $C_{1-3}$ alkyl;
X is O or N—R";
each occurrence of R is independently selected from the group consisting of H, $C_{1-3}$ alkyl, F, and perfluorinated $C_{1-3}$ alkyl;
each occurrence of R' is independently selected from the group consisting of H, $C_{1-3}$ alkyl, F, and perfluorinated $C_{1-3}$ alkyl;
each occurrence of R" is independently H or $C_{1-3}$ alkyl; and
p is an integer from 0 to 100,000.

Embodiment 15 provides the method of any one of embodiments 12-14, wherein the applying is performed in the absence of solvent.

Embodiment 16 provides the method of any one of embodiments 12-15, wherein the exposing is performed in situ.

Embodiment 17 provides the method of any one of embodiments 12-16, wherein the crosslinker is an epoxy curing agent.

Embodiment 18 provides a composite material comprising the IPN of any one of embodiments 1-11 or the IPN prepared according to any one of embodiments 12-17.

Embodiment 19 provides a composition comprising at least one monomer selected from the group consisting of:
wherein:

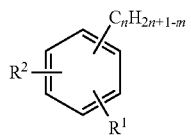

Formula II

-continued

Formula III

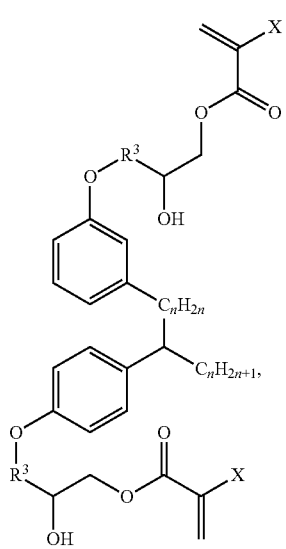

$R^1$ is

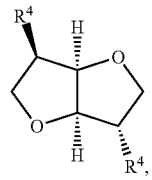

L is selected from the group consisting of a bond, $C_1$-$C_6$ alkyl, $C_2$-$C_6$ alkenyl, and $C_2$-$C_6$ alkynyl;
$R^2$ is selected from the group consisting of optionally substituted $C_1$-$C_6$ alkyl, optionally substituted $C_2$-$C_6$ alkenyl, and optionally $C_2$-$C_6$ alkynyl, wherein the substituents are selected from the group consisting of optionally substituted aryl and optionally substituted heteroaryl;
each instance of $R^3$ is independently selected from the group consisting of optionally substituted $C_1$-$C_6$ alkyl, optionally substituted $C_2$-$C_6$ alkenyl, optionally $C_2$-$C_6$ alkynyl;
$R^4$ is

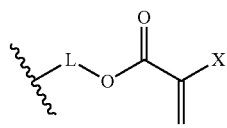

each instance of X is independently selected from the group consisting of optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, and optionally $C_1$-$C_6$ haloalkyl;

n is 5, 6, 7, 8, 9, 10, 11, 12, 13, 14, 15, 16, 17, 18, 19, or 20;
m is 0, 2, 4, 6, or 8.

Embodiment 20 provides the composition of embodiment 19, wherein the monomer of Formula II is selected from the group consisting of

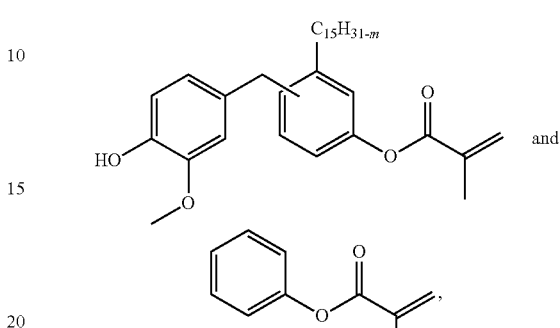

wherein m is 0, 2, 4 or 6.

Embodiment 21 provides the composition of any one of embodiments 19-20, wherein the monomer of Formula III is

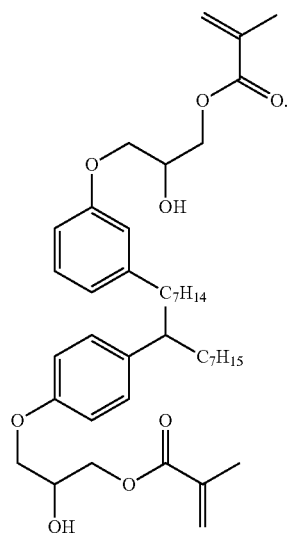

Embodiment 22 provides the composition of any one of embodiments 19-21, wherein the monomer of Formula IV is

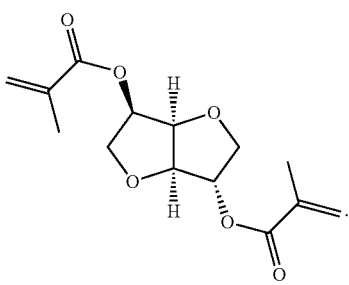 [SMILES: C=C(C)C(=O)O[C@H]1CO[C@H]2[C@@H]1OC[C@H]2OC(=O)C(=C)C]

Embodiment 23 provides the composition of any one of embodiments 19-22, further comprising at least one polymerization initiator.

Embodiment 24 provides the composition of any one of embodiments 19-23, wherein the polymerization initiator is at least one selected from the group consisting of photoinitiators, thermal initiators, and redox initiators.

Embodiment 25 provides the composition of any one of embodiments 19-24, wherein the photoinitiator is reactive upon exposure to light in the IR, visible, or UV spectrum.

Embodiment 26 provides the composition of any one of embodiments 19-25, wherein the photo initiator is selected from a group consisting of acetophenone, benzophenone, 2-phenylacetophenone, 2,2-dimethoxy-2-phenylacetophenone, bis(2,4,6-trimethylbenzoyl)-phenylphosphineoxide, 2-hydroxy-4'-(2-hydroxyethoxy)-2-methylpropiophenone, 2-methyl-(4-methylthienyl)-2-morpholinyl-1-propan-1-one, diphenyl(2,4,6-trimethylbenzoyl)phosphine oxide, ethyl(2,4,6-trimethylbenzoyl)phenyl phosphinate, lithium phenyl-2,4,6-trimethylbenzoylphosphinate,

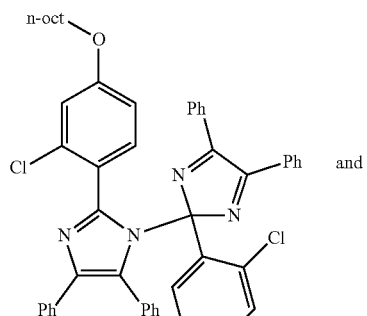

and

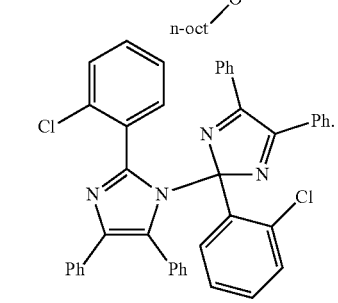

Embodiment 27 provides the composition of any one of embodiments 19-26, wherein the thermal initiator is selected from the group consisting of 4,4'-diaminodicyclohexyl methane, tert-amyl peroxybenzoate, 4,4-azobis(4-cyanovaleric acid), 1,1'-azobis(cyclohexanecarbonitrile), 2,2'-azobisisobutyronitrile (AIBN), benzoyl peroxide, 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-Butyl hydroperoxide, tert-butyl peracetate, tert-butyl peroxide, tert-butyl peroxybenzoate, tert-butylperoxy isopropyl carbonate, cumene hydroperoxide, methyl ethyl ketone peroxide, cyclohexanone peroxide, dicumyl peroxide, lauroyl peroxide, 2,4-pentanedione peroxide, peracetic acid and potassium persulfate.

Embodiment 28 provides the composition of any one of embodiments 19-27, wherein the redox initiator is selected from a group consisting of sodium iodide/hydrogen peroxide, potassium iodide/hydrogen peroxide, benzoyl peroxide/dimethyaniline, benzoyl peroxide/N,N-dimethyl p-toluidine, benzoyl peroxide/4-N,N-dimethylaminophenethyl alcohol, benzoyl peroxide/ethyl 4-dimethylaminobenzoate, glucose oxidase/oxygen/iron(II) sulfate and copper(II) sulfate/sodium ascorbate.

Embodiment 29 provides the composition of any one of embodiments 19-28, wherein the monomer of Formula III comprises about 50% to about 85% of weight of the composition.

Embodiment 30 provides the composition of any one of embodiments 19-29, wherein the monomer of Formula II comprises about 15% to about 30% of weight of the composition.

Embodiment 31 provides the composition of any one of embodiments 19-30, wherein the monomer of Formula IV comprises about 0% to about 40% of weight of the composition.

Embodiment 32 provides the composition of any one of embodiments 19-31, wherein the composition is photocurable within about 0-20 seconds.

Embodiment 33 provides the composition of any one of embodiments 19-32, wherein the composition has viscosity of about 250 to about 5000 cPs at room temperature.

Embodiment 34 provides a kit comprising the composition of any one of embodiments 1-33 and instructional material for forming a polymer network using the composition of the kit.

Embodiment 35 provides a monomer comprising Formula II, Formula III, Formula III-A, or Formula IV:

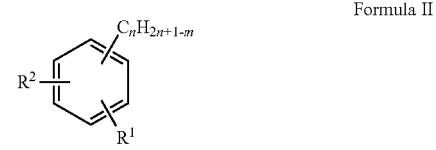

Formula II

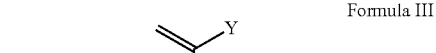

Formula III

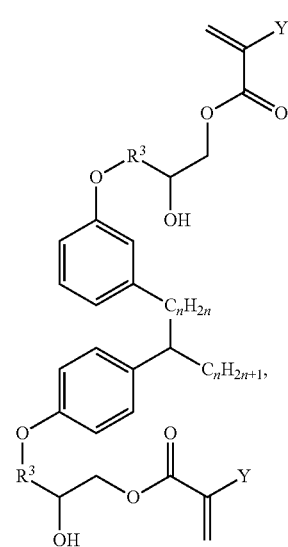

-continued

Formula III-A

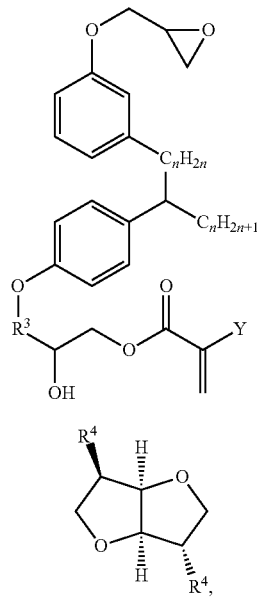

wherein:
R$^1$ is

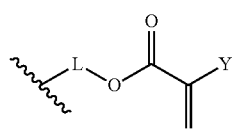

L is selected from the group consisting of a bond, C$_1$-C$_6$ alkyl, C$_2$-C$_6$ alkenyl, and C$_2$-C$_6$ alkynyl;
R$^2$ is selected from the group consisting of optionally substituted C$_1$-C$_6$ alkyl, optionally substituted C$_2$-C$_6$ alkenyl, optionally C$_2$-C$_6$ alkynyl, wherein the substituents are selected from the group consisting of optionally substituted aryl and optionally substituted heteroaryl;
each instance of R$^3$ is independently selected from the group consisting of optionally substituted C$_1$-C$_6$ alkyl, optionally substituted C$_2$-C$_6$ alkenyl, optionally C$_2$-C$_6$ alkynyl;
R$^4$ is

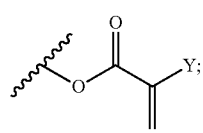

each instance of y is independently selected from the group consisting of optionally substituted C$_1$-C$_6$ alkyl, optionally substituted C$_2$-C$_6$ alkenyl, optionally C$_2$-C$_6$ alkynyl, optionally C$_1$-C$_6$ alkoxy, optionally C$_1$-C$_6$ aminoalkyl, optionally C$_1$-C$_6$ haloalkoxy, and optionally C$_1$-C$_6$ haloalkyl;
n is 5,6,7,8,9, 10, 11, 12, 13, 14, 15, 16, 17, 18, 19, or 20;
m is 0, 2, 4, 6, or 8.

What is claimed is:

1. An interpenetrating polymer network (IPN) comprising the reaction product of:
    a crosslinker comprising at least one epoxy curing group; and
    a compound comprising at least one vinyl ester functionality and at least one epoxy functionality,
    wherein the IPN further comprises

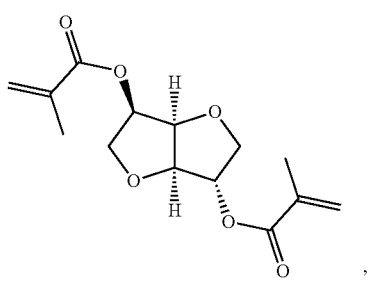 [SMILES: C=C(C)C(=O)O[C@H]1CO[C@H]2[C@@H]1OC[C@H]2OC(=O)C(=C)C]

or a crosslinked product thereof,
    wherein the at least one vinyl ester functionality is polymerized by photo-induced, free radical polymerization, and
    wherein the at least one epoxy functionality and the crosslinker are polymerized by thermal step-growth polymerization.

2. The IPN of claim 1, wherein the compound has the structure of Formula I or Formula I-A:

Formula I

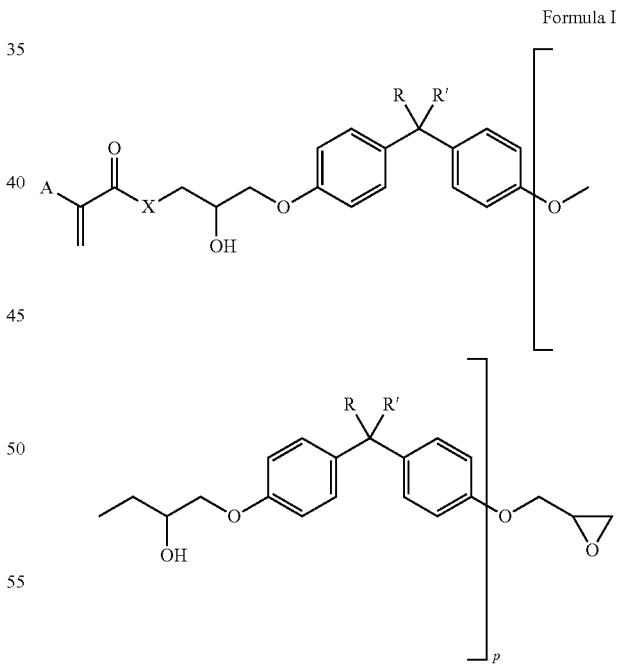

Formula I-A

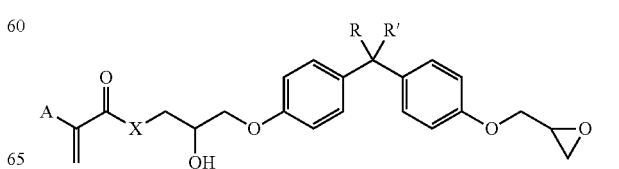

wherein:

A is selected from the group consisting of H, $C_{1-3}$ alkyl, CN, F, Cl, and perfluorinated $C_{1-3}$ alkyl;

X is O or N—R";

each occurrence of R is independently selected from the group consisting of H, $C_{1-3}$ alkyl, F, and perfluorinated $C_{1-3}$ alkyl;

each occurrence of R' is independently selected from the group consisting of H, $C_{1-3}$ alkyl, F, and perfluorinated $C_{1-3}$ alkyl;

each occurrence of R" is independently H or $C_{1-3}$ alkyl; and p is an integer from 1 to 100,000.

3. The IPN of claim 1, wherein R is $CH_3$.

4. The IPN of claim 1, wherein R' is $CH_3$.

5. The IPN of claim 1, wherein the compound of Formula I has the structure:

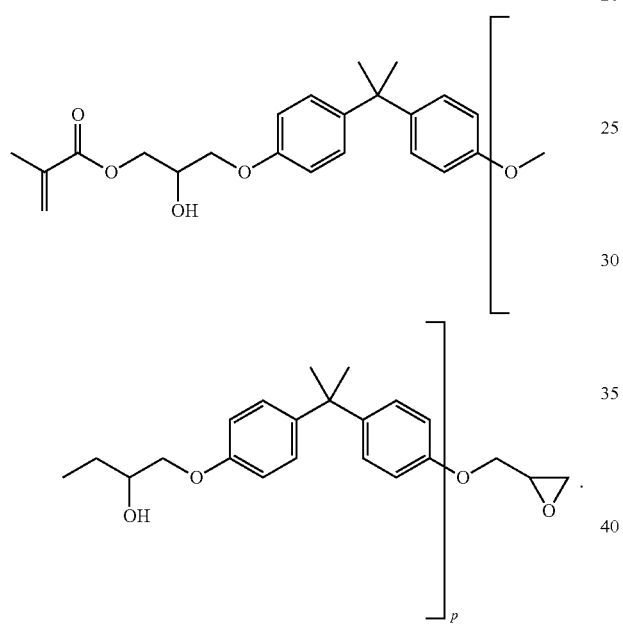

6. The IPN of claim 1, wherein the compound has the structure of Formula III-A:

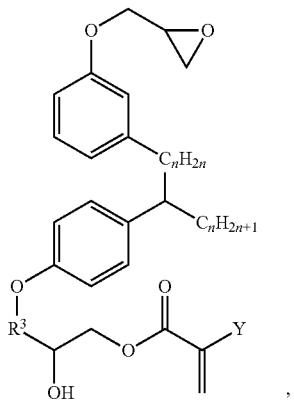

Formula III-A wherein:

each instance of $R^3$ is independently selected from the group consisting of optionally substituted $C_1$-$C_6$ alkyl, optionally substituted $C_2$-$C_6$ alkenyl, optionally $C_2$-$C_6$ alkynyl;

each instance of Y is independently selected from the group consisting of optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, and optionally $C_1$-$C_6$ haloalkyl; and n is 5, 6, 7, 8, 9, 10, 11, 12, 13, 14, 15, 16, 17, 18, 19, or 20.

7. A method of preparing an interpenetrating polymer network (IPN), the method comprising:

applying vat photopolymerization (VPP) to a mixture of: a crosslinker comprising at least one amine functionality, and a monomer, oligomer, or polymer bearing at least one vinyl ester functionality and at least one epoxy functionality, under conditions whereby the vinyl ester functionality is photopolymerized; and exposing the resulting mixture to thermal conditions whereby epoxy-amine polymerization takes place to form the IPN, wherein the IPN further comprises

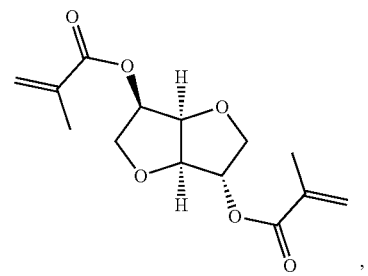 [SMILES: C=C(C)C(=O)O[C@H]1CO[C@H]2[C@@H]1OC[C@H]2OC(=O)C(=C)C]

or a crosslinked product thereof.

8. The method of claim 7, wherein the monomer has the structure of Formula I-A

Formula I-A

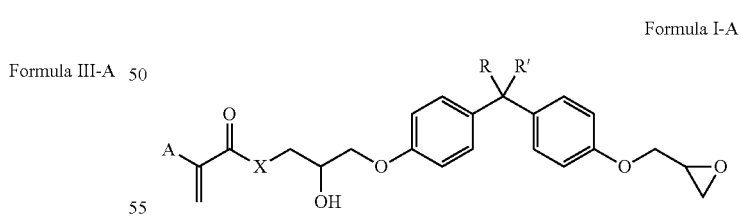

wherein:

A is selected from the group consisting of H, $C_{1-3}$ alkyl, CN, F, Cl, and perfluorinated $C_{1-3}$ alkyl;

X is O or N—R";

R is selected from the group consisting of H, $C_{1-3}$ alkyl, F, and perfluorinated $C_{1-3}$ alkyl;

R' is selected from the group consisting of H, $C_{1-3}$ alkyl, F, and perfluorinated $C_{1-3}$ alkyl;

R" is H or $C_{1-3}$ alkyl.

9. The method of claim 7, wherein the polymer has the structure of Formula I:

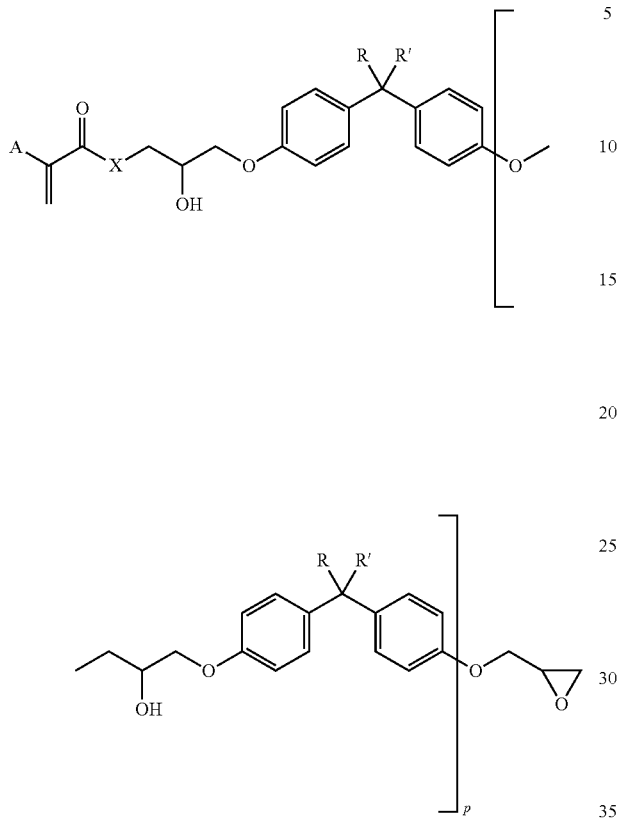

wherein:

A is selected from the group consisting of H, $C_{1-3}$ alkyl, CN, F, Cl, and perfluorinated $C_{1-3}$ alkyl;

X is O or N—R";

each occurrence of R is independently selected from the group consisting of H, $C_{1-3}$ alkyl, F, and perfluorinated $C_{1-3}$ alkyl;

each occurrence of R' is independently selected from the group consisting of H, $C_{1-3}$ alkyl, F, and perfluorinated $C_{1-3}$ alkyl;

each occurrence of R" is independently H or $C_{1-3}$ alkyl; and p is an integer from 1 to 100,000.

10. The method of claim 7, wherein the exposing is performed in situ.

11. A composite material comprising the IPN of claim 1.

12. A composition comprising at least one monomer selected from the group consisting of:

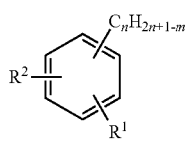

Formula II

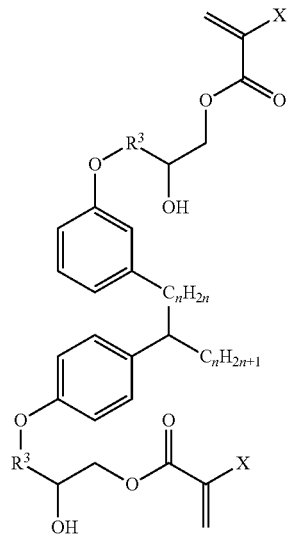

Formula III

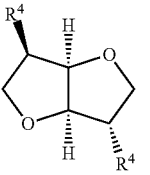

Formula IV wherein:
$R^1$ is

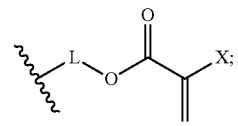

L is selected from the group consisting of a bond, $C_1$-$C_6$ alkyl, $C_2$-$C_6$ alkenyl, and $C_2$-$C_6$ alkynyl;

$R^2$ is selected from the group consisting of optionally substituted $C_1$-$C_6$ alkyl, optionally substituted $C_2$-$C_6$ alkenyl, and optionally $C_2$-$C_6$ alkynyl, wherein the substituents are selected from the group consisting of optionally substituted aryl and optionally substituted heteroaryl;

each instance of $R^3$ is independently selected from the group consisting of optionally substituted $C_1$-$C_6$ alkyl, optionally substituted $C_2$-$C_6$ alkenyl, optionally $C_2$-$C_6$ alkynyl;

$R^4$ is

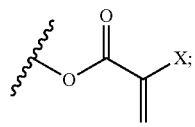

each instance of X is independently selected from the group consisting of optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, and optionally $C_1$-$C_6$ haloalkyl;

n is 5, 6, 7, 8, 9, 10, 11, 12, 13, 14, 15, 16, 17, 18, 19, or 20;

m is 0, 2, 4, 6, or 8.

13. The composition of claim 12, wherein the monomer of Formula II is selected from the group consisting of

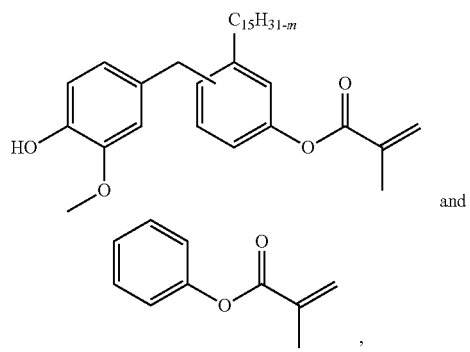

and

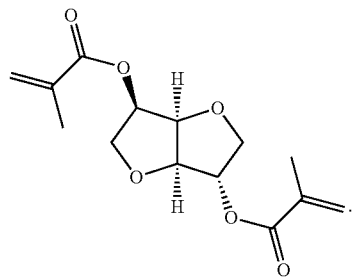

wherein m is 0, 2, 4 or 6.

14. The composition of claim 12, wherein the monomer of Formula III is

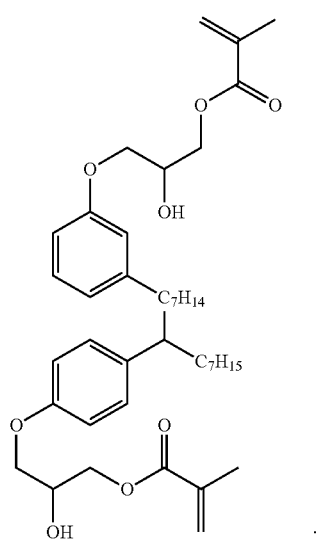

15. The composition of claim 12, wherein the monomer of Formula IV is

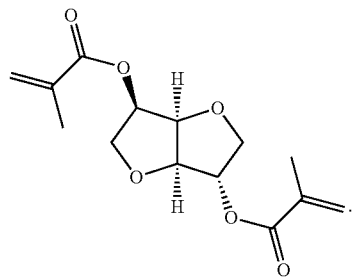 [SMILES: C=C(C)C(=O)O[C@H]1CO[C@H]2[C@@H]1OC[C@H]2OC(=O)C(=C)C]

16. The composition of claim 14, further comprising at least one polymerization initiator.

17. The composition of claim 14, wherein the polymerization initiator is at least one selected from the group consisting of photoinitiators, thermal initiators, and redox initiators.

18. The composition of claim 12, wherein at least one of the following is true:
   a) the monomer of Formula III comprises about 50% to about 85% of weight of the composition;
   b) the monomer of Formula II comprises about 15% to about 30% of weight of the composition;
   c) the monomer of Formula IV comprises about 0% to about 40% of weight of the composition;
   d) the composition is photocurable within about 0-20 seconds; and
   e) the composition has viscosity of about 250 to about 5000 cPs at room temperature.

19. A monomer comprising of Formula II, Formula III, Formula III-A, or Formula IV:

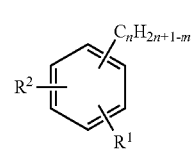

Formula II

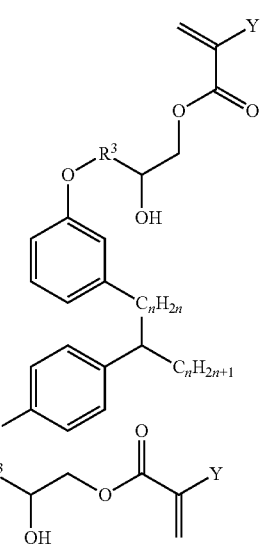

Formula III

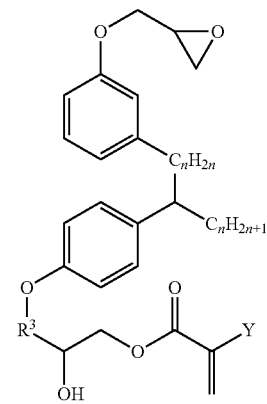

Formula III-A

-continued

Formula IV

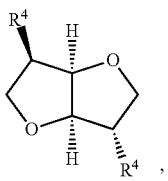

wherein:

R¹

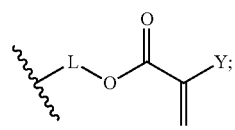

L is selected from the group consisting of a bond, $C_1$-$C_6$ alkyl, $C_2$-$C_6$ alkenyl, and $C_2$-$C_6$ alkynyl;

R² is selected from the group consisting of optionally substituted $C_1$-$C_6$ alkyl, optionally substituted $C_2$-$C_6$ alkenyl, optionally $C_2$-$C_6$ alkynyl, wherein the substituents are selected from the group consisting of optionally substituted aryl and optionally substituted heteroaryl;

each instance of R³ is independently selected from the group consisting of optionally substituted $C_1$-$C_6$ alkyl, optionally substituted $C_2$-$C_6$ alkenyl, optionally $C_2$-$C_6$ alkynyl;

R⁴ is

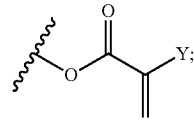

each instance of Y is independently selected from the group consisting of optionally substituted $C_1$-$C_6$ alkyl, optionally substituted $C_2$-$C_6$ alkenyl, optionally $C_2$-$C_6$ alkynyl, optionally $C_1$-$C_6$ alkoxy, optionally $C_1$-$C_6$ aminoalkyl, optionally $C_1$-$C_6$ haloalkoxy, and optionally $C_1$-$C_6$ haloalkyl;

n is 5, 6, 7, 8, 9, 10, 11, 12, 13, 14, 15, 16, 17, 18, 19, or 20;

m is 0, 2, 4, 6, or 8.

* * * * *